US012738890B2

(12) United States Patent
Hall-Thompson et al.

(10) Patent No.: US 12,738,890 B2
(45) Date of Patent: Sep. 15, 2026

(54) SOLAR ENERGY STORAGE AND AQUIFER MANAGEMENT

(71) Applicant: SAUDI ARABIAN OIL COMPANY, Dhahran (SA)

(72) Inventors: Bryan Hall-Thompson, Dhahran (SA); Ahmed H. Hutheli, Dhahran (SA); Mohammad R. Hudaithi, Dhahran (SA); Ghadeer A. Alrumaih, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 28 days.

(21) Appl. No.: 18/731,144

(22) Filed: May 31, 2024

(65) Prior Publication Data

US 2025/0373200 A1 Dec. 4, 2025

(51) Int. Cl.
*H02S 40/44* (2014.01)
*F24S 20/20* (2018.01)
(Continued)

(52) U.S. Cl.
CPC .............. *H02S 40/44* (2014.12); *F24S 20/20* (2018.05); *F24S 60/30* (2018.05); *H02S 40/10* (2014.12); *H02S 50/00* (2013.01)

(58) Field of Classification Search
None
See application file for complete search history.

(56) References Cited

U.S. PATENT DOCUMENTS 3,330,356 A 7/1967 Hottman
4,445,499 A 5/1984 Platell
(Continued)

FOREIGN PATENT DOCUMENTS

CN 112710164 A 4/2021
EP 3252944 A1 12/2017
(Continued)

OTHER PUBLICATIONS

Ellerbeck, "Here's why geothermal systems could be better for storing renewable energy than batteries," World Economic Forum, Nov. 2, 2022, 11 pages; https://www.weforum.org.genda/2022/11/geothermal-renewable-energy-storage/.

Patel, "Geothermal May Beat Batteries for Energy Storage, Enhanced geothermal systems are well suited to store excess renewable power as heat," IEEE Spectrum, Nov. 29, 2023, https://spectrum.ieee.org/geothermal-energy.

(Continued)

*Primary Examiner* — Ryan S Cannon
(74) *Attorney, Agent, or Firm* — Vorys, Sater, Seymour and Pease LLP

(57) ABSTRACT

A solar energy storage management system includes a solar thermal collection unit, a photovoltaic pre-heating system, and heat exchanger. The solar thermal collection unit collects incident radiation and adds heat into a heat transfer fluid. The first photovoltaic pre-heating system pre-heats a spent stream from a utilization facility. The heat exchanger conveys heat from the heat transfer fluid and pre-heated stream to a storage stream for output to an aquifer thermal storage system. A method for managing solar energy storage and production includes collecting incident radiation with a solar thermal collection unit, adding heat into a heat transfer fluid, and conveying the heat transfer fluid to a heat exchanger for later storage of thermal energy in an aquifer thermal storage system. Systems and methods monitor heat storage and operational characteristics of the aquifer thermal storage system.

16 Claims, 14 Drawing Sheets

(51) Int. Cl.

| | |
|---|---|
| ***F24S 60/30*** | (2018.01) |
| ***H02S 40/10*** | (2014.01) |
| ***H02S 50/00*** | (2014.01) |

(56) References Cited

U.S. PATENT DOCUMENTS

| | | | | |
|---|---|---|---|---|
| 7,472,548 | B2 | 1/2009 | Meksvanh et al. | |
| 9,850,878 | B2 | 12/2017 | Newman | |
| 11,719,468 | B1 * | 8/2023 | Riley | F24T 10/30 165/45 |
| 2006/0048770 | A1 | 3/2006 | Meksvanh et al. | |
| 2010/0071366 | A1 | 3/2010 | Klemencic | |
| 2011/0011802 | A1 * | 1/2011 | Maydan | C02F 1/441 422/38 |
| 2011/0126539 | A1 | 6/2011 | Ramaswamy et al. | |
| 2011/0126824 | A1 * | 6/2011 | Conlon | F22B 35/16 126/569 |
| 2013/0056171 | A1 | 3/2013 | Klemencic | |

FOREIGN PATENT DOCUMENTS

| | | | |
|---|---|---|---|
| WO | 2008000932 | A2 | 1/2008 |
| WO | 2012006288 | A2 | 1/2012 |

OTHER PUBLICATIONS

Patidar et al. "A review of tracer testing techniques in porous media specially attributed to the oil and gas industry," Journal of Petroleum Exploration and Production Technology, Jun. 25, 2022, pp. 3339-3356, vol. 12. https://doi.org/10.1007/s13202-022-01526-w.

* cited by examiner

TESTED PRESSURE CONTROL SYSTEM FOR A STORAGE

THERMAL GROWTH OF A STORAGE SYSTEM

CONTAINMENT OF THERMAL STORAGE

COMPUTER APPROACH TO MONITOR TOTAL SYSTEM PERFORMANCE

DEVELOPED ALGORITHM TO MONITOR ENERGY PERFORMANCE FOR EACH WELL IN A SYSTEM

SOLAR ENERGY STORAGE AND AQUIFER MANAGEMENT

CROSS-REFERENCE TO RELATED APPLICATIONS

None.

FIELD OF THE DISCLOSURE

This disclosure relates generally to renewable energy, and more specifically, to solar energy production.

BACKGROUND

Solar thermal energy is a form of renewable energy used in a variety of applications. A solar thermal collector unit concentrates sunlight to capture thermal energy. The captured thermal energy is used to power a facility, such as a power plant, industrial plant, or other machinery.

One drawback in the use of solar thermal energy is that solar production output varies depending upon the incident sunlight radiation. The production output from a solar thermal collector unit can vary depending on the time of day, angle of incidence of sunlight on the collector, weather conditions, and other factors. This varying production output is undesirable for facilities that rely on solar power and which require a more continuous power supply (baseload) to operate. Moreover, at certain times, a solar thermal collection unit may generate excessive heat which may be wasted if not able to be used immediately by a facility.

Geothermal systems have been used to provide thermal energy to power a facility as well. Thermal energy can also be stored underground in reservoirs or aquifers. In this way, underground thermal energy storage can act like a battery to store thermal energy for later use in heating or cooling applications.

What are needed are renewable energy systems and methods that can provide efficient, continuous production suitable for a baseload to a utilization facility.

BRIEF SUMMARY

Various details of the present disclosure are hereinafter summarized to provide a basic understanding. This summary is not an extensive overview of the disclosure and is neither intended to identify certain elements of the disclosure nor to delineate the scope thereof. Rather, the primary purpose of this summary is to present some concepts of the disclosure in a simplified form prior to the more detailed description that is presented hereinafter.

In one aspect, a solar energy storage management system includes a solar thermal collection unit configured to collect incident radiation and add heat into a heat transfer fluid, a first photovoltaic pre-heating system configured to pre-heat a spent stream from a utilization facility to generate a first pre-heated stream, and a heat exchanger configured to convey heat from the heat transfer fluid and the first pre-heated stream to a storage stream for output to an aquifer thermal storage system.

In another aspect, a method for managing solar energy storage and production includes collecting incident radiation with a solar thermal collection unit and adding heat into a heat transfer fluid transfer fluid, and conveying the heat transfer fluid through a first thermal insulated pipe to a heat exchanger. Other steps include pre-heating a spent stream from a utilization facility with a photovoltaic pre-heating system to generate a first pre-heated stream for output to the heat exchanger, transferring at the heat exchanger heat energy from the heat transfer fluid and the first pre-heated stream to a storage stream, and outputting the storage stream with the added heat energy through a second thermal insulated pipe to an aquifer thermal storage system. Another step of monitoring heat storage and operational characteristics of the aquifer thermal storage system may be performed.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
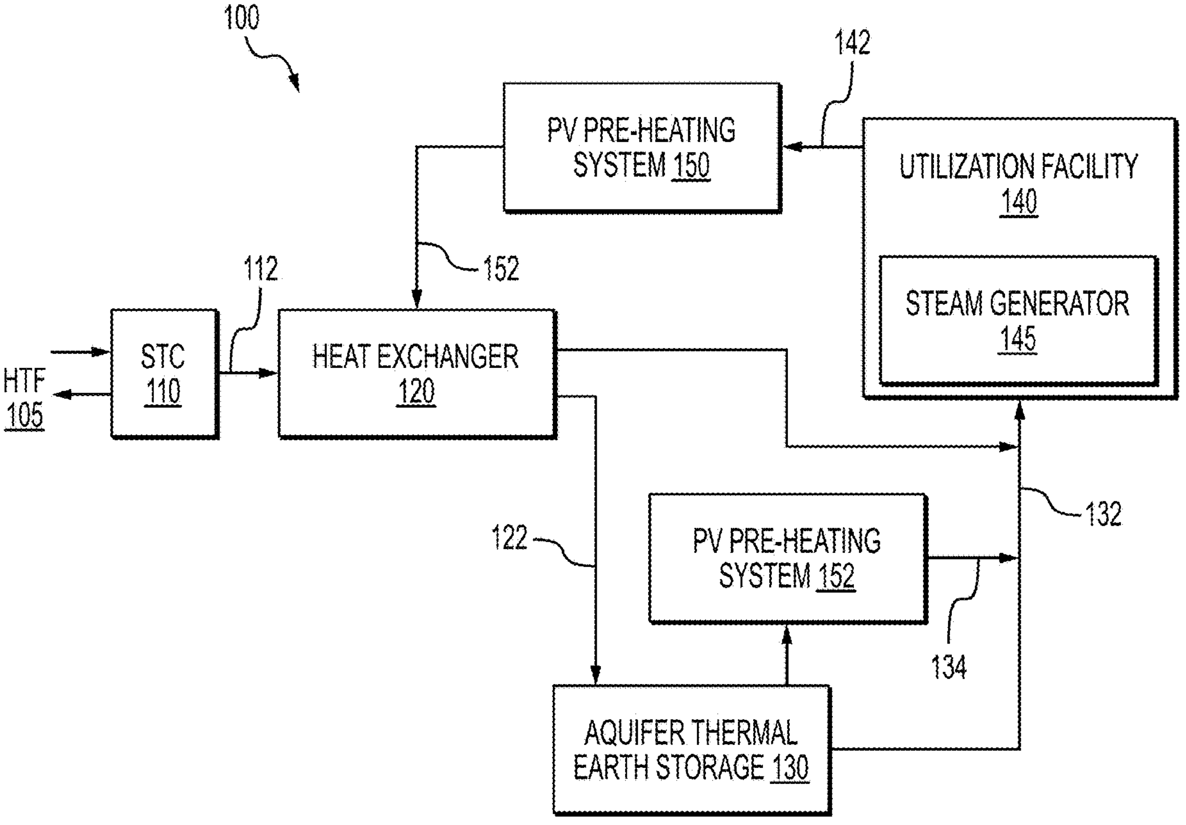
FIG. 1 is a diagram of a solar energy storage management system 100 in accordance with one embodiment.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Solar Energy Storage Management System

FIG. 1 is a diagram of a solar energy storage management system 100 in accordance with one embodiment. Solar energy storage management system 100 includes a solar thermal collection unit 110, heat exchanger 120, aquifer thermal storage system 130, and a photovoltaic pre-heating system 150. A utilization facility 140 having a steam generator 145 may be included. A second photovoltaic pre-heating system 152 may also be included.

Solar energy storage management system 100 manages thermal energy storage in aquifer thermal storage system 130 for later use and output to steam generator 145 in utilization facility 140. Solar thermal collection unit 110 is configured to collect incident solar radiation and add heat into a heat transfer fluid (HTF) 105. For example, solar thermal collection unit 110 may include an array of optical elements, such as lenses and/or mirrors, which collect or concentrate incident radiation to add thermal energy (heat) to a HTF 105. HTF 105 with the added thermal energy passes as an input stream 112 to heat exchanger 120.

In a further feature, photovoltaic pre-heating system 150 pre-heats a spent stream 142 output from utilization facility 140 to generate a pre-heated stream 152. Pre-heated stream 152 passes to heat exchanger 120. Heat exchanger 120 then transfers heat from input stream 112 and pre-heated stream 152 into a storage stream 122. Storage stream 122 is output to aquifer thermal storage system 130.

In one embodiment, photovoltaic pre-heating system 150 uses an array of photovoltaic (PV) panels configured to generate electrical power in response to incident radiation. Because photovoltaic pre-heating system 150 is a renewable energy source this pre-heating makes system 100 and its thermal storage management even more efficient and climate and environment friendly. In further features, photovoltaic pre-heating system 150 also uses a spray device for surface washing. The spray device can spray at least a part of spent stream 142 from utilization facility 140 onto the array of photovoltaic panels to wash surfaces of the panels which make the PV panel operation and generation of electric power even more efficient. A pump circulates at least a part of spent stream 142 underneath or near the array of photovoltaic panels. An electric heater adds heat to spent stream 142. Each of the spray device, pump and electric heater are operated with electrical power generated by the array of photovoltaic panels. In this way, photovoltaic pre-heating system 150 can operate as a renewable power source for pre-heat stream 152. Its use of a spent stream 142 from utilization facility 140 also makes the overall operation of system 100 even more efficient and climate and environment friendly. An example of a photovoltaic pre-heating system is further described with respect to FIG. 6.

Aquifer thermal storage system 130 may be any type of underground thermal energy storage system. Aquifer thermal storage system 130 may have one or more natural or artificial reservoirs or aquifers which can be aboveground, underground or a combination of both. In one embodiment, an aquifer may be a region underground having space in layers of rock or other sediment that can hold groundwater or other liquids which store thermal energy. In this way, thermal energy in storage stream 122 may be stored in aquifer thermal storage system 130 until it is needed for use in utilization facility 140.

Aquifer thermal storage system 130 may also include one or more injector wells and producer wells arranged to inject and extract thermal fluid in a region of the aquifer thermal storage system 130. The reservoir section of the injector wells are completed as oriented perforations to direct the flow path of the injected water in a specific azimuth or direction in the storage reservoir.

When utilization facility 140 needs thermal energy to drive a steam generator 145, a drive stream 132 having thermal energy is pumped from aquifer thermal storage system 130. Drive stream 132 may be sent from aquifer thermal storage system 130 directly to steam generator 145 or may pass through another photovoltaic pre-heating system 152 to add more heat to a stream extracted from the aquifer thermal storage system 130 for a drive stream 132. Also to further increase system efficiency, output from steam generator 145 may be condensed or passed as spent stream 142 input to photovoltaic pre-heating system 150 as described above.

While heat exchanger 120 can provide all or part of its output as a storage stream 122 for thermal energy storage, heat exchanger 120 may also be configured to send an output stream directly to steam generator 145 or to photovoltaic pre-heating system 152 to provide a drive stream 132 without thermal storage.

In embodiments, HTF 105 and each of the streams 112, 122, 132, 134, 142 and 152 conveyed in system 100 may be made up of or include any type of thermal fluid (liquid or gas) that can convey and transfer thermal energy. For example, water, glycol/water solutions, deionized water, dielectric fluid, synthetic oil and generally fluids with lower boiling temperature than water may be used as a heat transfer fluid.

In a further feature, thermal insulated conduits are used in system 100 to convey HTF 105 and each of the streams 112, 122, 132, 134, 142 and 152. This further reduces heat loss and increases the efficiency of system 100. In one embodiment, a set of thermal pipes are used in system 100. The set of thermal pipes are Reinforced Thermal Pipe (RTP) or Flexible Composite Pipe (FCP) pipe connections in certain embodiments. The RTP or FCP pipe connections may be used to convey HTF 105 and any of the streams 112, 122, 132, 134, 142 and 152, especially in pipe connections to and from aquifer thermal storage system 130 that convey storage stream 122, drive stream 132, and pre-heated stream 134 to reduce heat loss relating to thermal energy storage and extraction.

Figure 2:
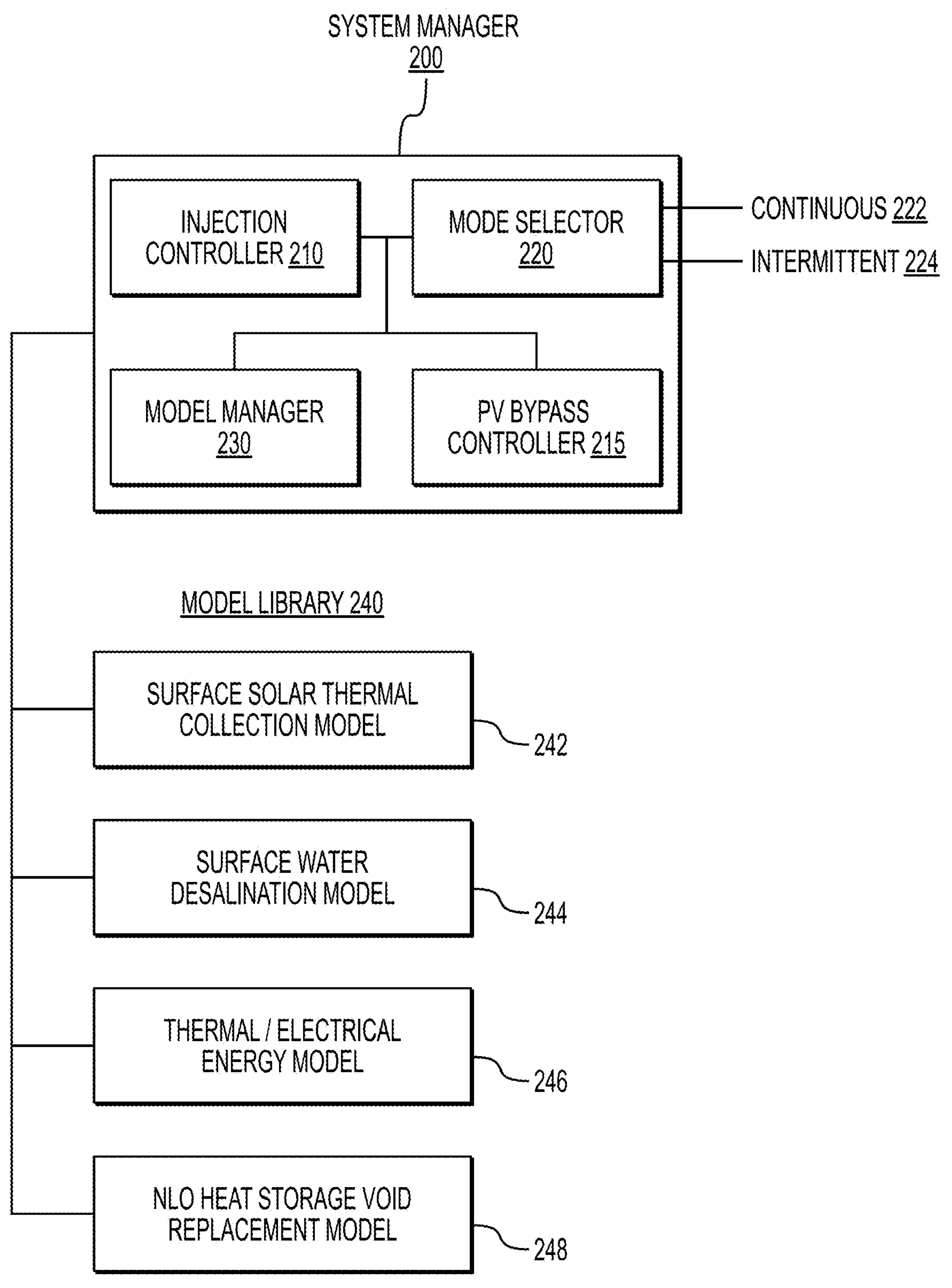
FIG. 2 is diagram of system manager 200 and model library 240 according to an embodiment.

FIG. 2 is a diagram of system manager 200 and model library 240 according to an embodiment. System manager 200 is implemented on at least one processor. Model library 240 is stored on a computer-readable storage device. System manager 200 includes an injection controller 210, PV bypass controller 215, mode selector 220 and model manager 230. Injection controller 210 controls injection of the storage stream 122 output from heat exchanger 120 into aquifer thermal storage system 130. PV bypass controller 215 controls whether or not the circulation of stream 142 is directed to bypass PV panels in PV pre-heating system 150.

System 100 may be operated in a continuous mode or an intermittent mode as needed to meet demand and ensure a reliable and satisfactory amount of thermal energy is provided to utilization facility 140. In one embodiment, mode selector 220 operates in either a continuous mode or an intermittent mode such that the injection of the storage stream into injection wells and output through producer wells occurs continuously during operation to provide a baseload to the utilization facility in the continuous mode or occurs during periods when operation is needed to meet demand to provide a baseload to the utilization facility in the intermittent mode.

Model manager 230 can access one or more models in model library 240 to obtain predictive data relating to the operation of the solar energy management system 100. As shown in FIG. 2, in one feature, model library 240 includes a surface solar thermal collection model 242, a surface water desalination model 244, a thermal to electrical energy model 246, and one or more non-linear optimization models 248 to simultaneously estimate reservoir void replacement and maintain heat storage. In this way, predictive data from models 242-248 may be used to obtain efficient continuous heat storage in an aquifer and a production output in the drive stream 132 are required to meet a power demand of utilization facility 140. Examples of models 242-248 are described further below.

Figure 3:
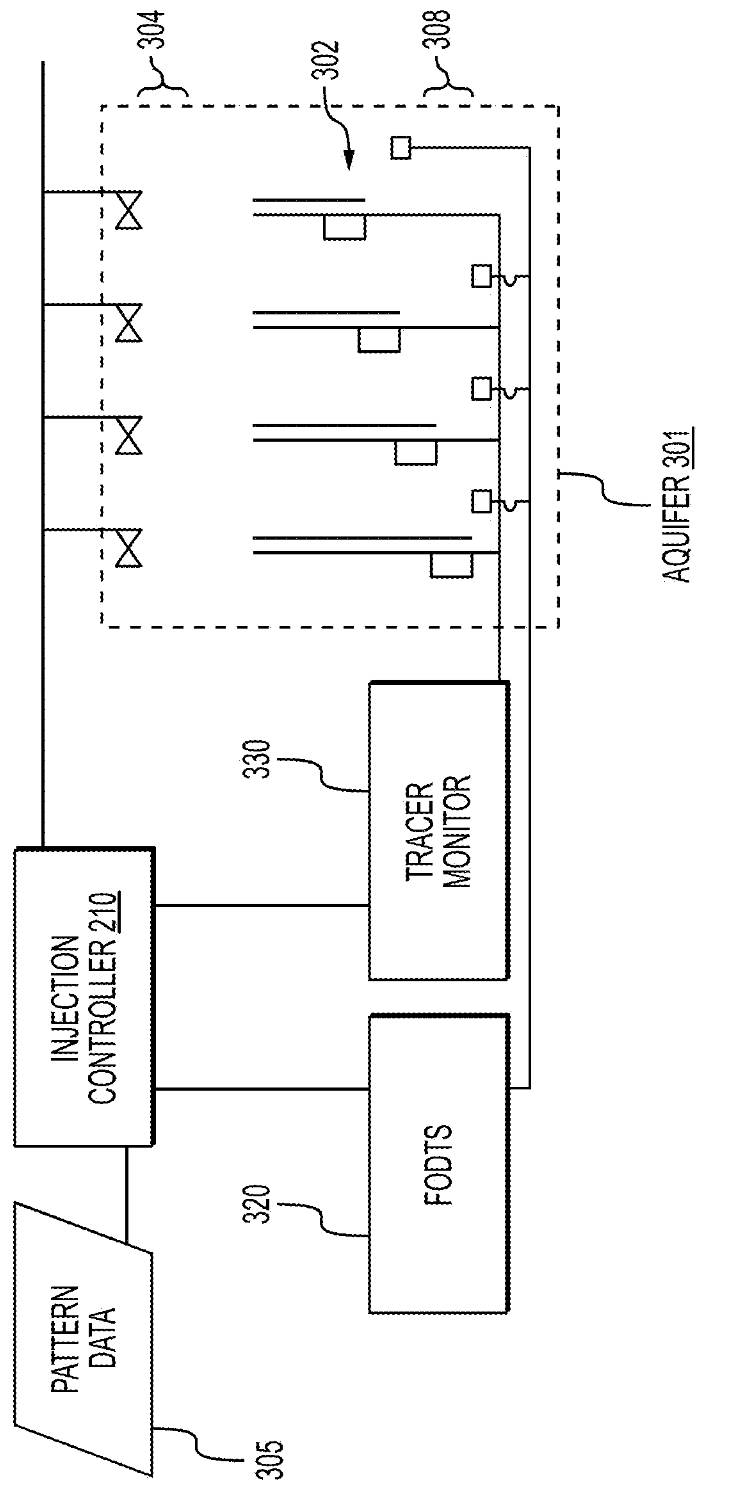
FIG. 3 is a diagram of further injection control components according to an embodiment.

FIG. 3 is a diagram of further injection control components according to an embodiment. Injector controller 210 is coupled to access pattern data 305. Pattern data 305 identifies a pattern of injector wells 302 and producer wells (not shown) within an aquifer 301. Injector controller 210 then can control injection of the storage stream 122 into the injection wells based on the pattern identified in pattern data 305. A fiber optic distributed temperature system (FODTS) 320 is coupled to a distributed fiber optic temperature sensor 308 which detects temperature in different areas near the injector wells 302 and producer wells within aquifer 301. Tracer monitors 330 receives output signals from the produced streams through a set of chemical tracers 306 positioned at or near the injector wells 302 and producer wells within aquifer 301. Tracer monitor 330 processes the output signals form the set of chemical tracers to determine relative amounts of fluid in areas of the aquifer and to ensure injection wells are used to fill areas of the aquifer which are depleted and producer wells are used to extract from areas which are not depleted.

System manager 200 processes input from fiber optic distributed temperature system 320 and sends a control signal to injection controller 210 to control injection of storage stream 122 into respective injection wells equipped with inflow control devices to balance temperature differences across aquifer 301. System manager 200 further processes input from tracer monitor 330 and sends another control signal to injection controller 210 to control injection of storage stream 122 into respective injection wells which are relatively depleted. System manager 200 can further process pattern data 305 and send a control signal to direct injection controller 210 to distribute all or part of storage stream 122 into respective injection wells which are relatively depleted according to the pattern of their arrangement.

In embodiments, system manager 200 can be implemented on any electronic computing device or computing platform. The computing device can include, but is not limited to, a desktop computer, laptop computer, set-top box, smart television, smart display screen, kiosk, a mobile computing device (such as a smartphone or tablet computer), wearable computing device (such as a smart watch, goggles, or headset), or other type of computing device having at least one processor and computer-readable memory. In addition to at least one processor and memory, such a computing device may include software, firmware, hardware, or a combination thereof. Software may include one or more applications, a browser, and an operating system. Hardware can include, but is not limited to, a processor, memory, display or other input/output device. A communication interface and transceiver can be included to perform data communication (wired or wireless) over a network.

System manager 200 may be implemented on a computing platform including on one or more servers. The servers include one or more processors and can be distributed at the same or different locations. The servers may communicate over one or more data networks or combination of networks including, but not limited to, a local area network, medium area network or wide area network, such as, the Internet. Web servers may also be included and coupled to servers of a platform to support SaaS operations on platform and enable communications (through Web protocols and networking layers) between platform and browsers on remote computing devices. System manager 200 may also communicate with other services through application programming interfaces (APIs) or other communication interfaces.

Solar Energy Storage Management Operation

For brevity, the operation of system 100 is further described with reference to methods in FIGS. 4-5, but is not necessarily intended to limit the methods to particular system embodiments.

Figure 4A:
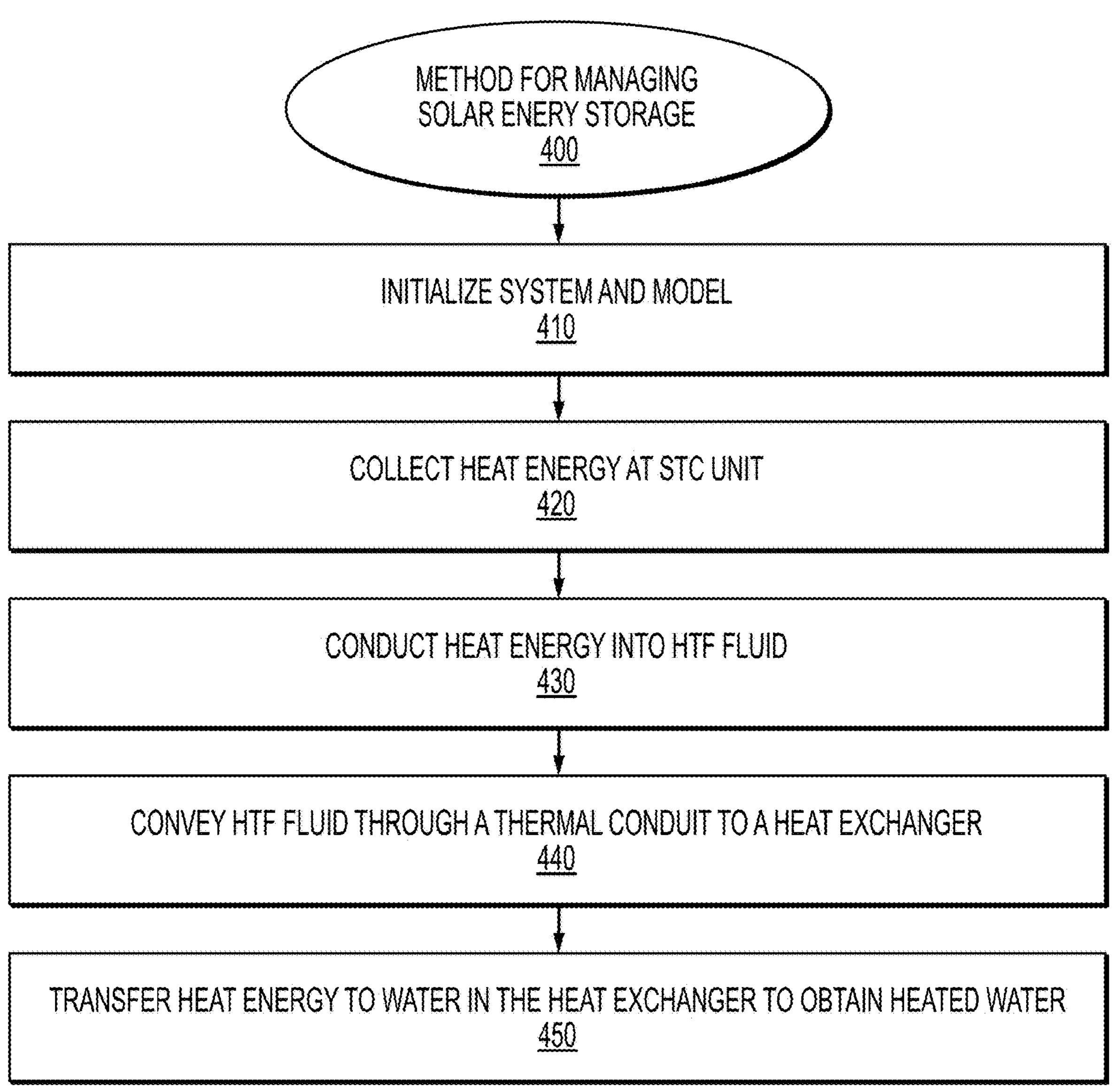
FIGS. 4A and 4B are flowchart diagrams illustrating a method for managing solar energy storage and production 400 according to an embodiment.
Figure 4B:
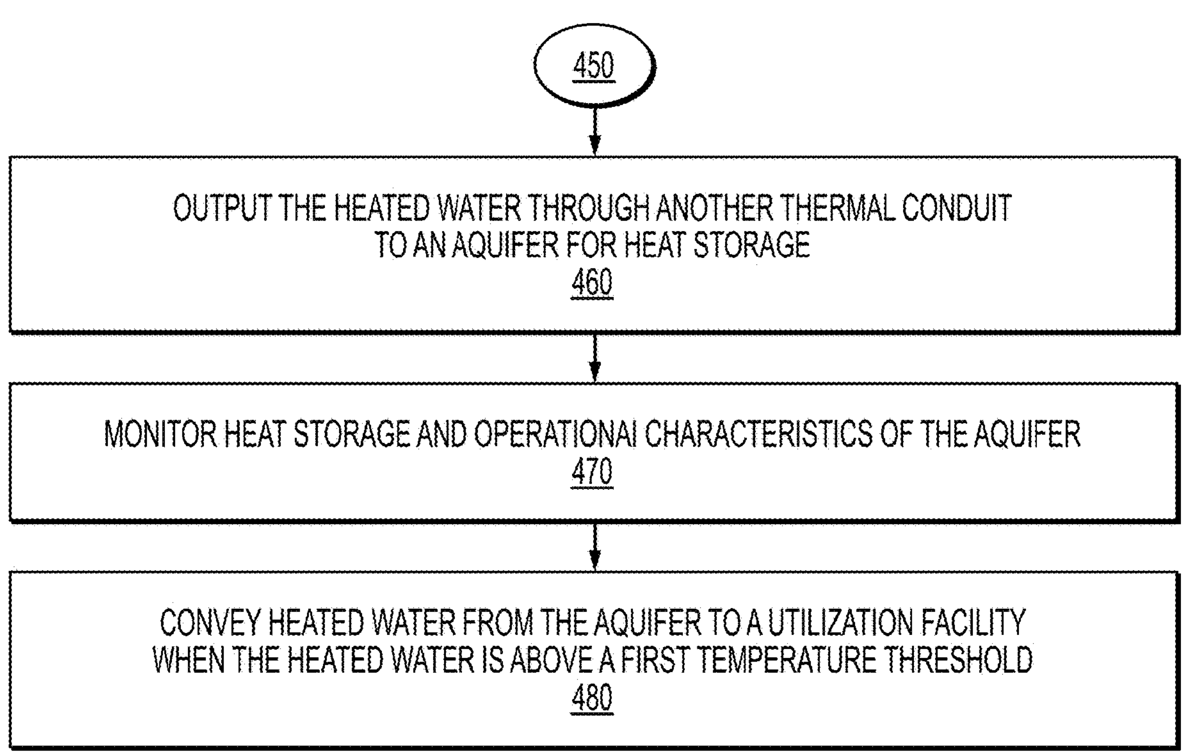
Figure 5:
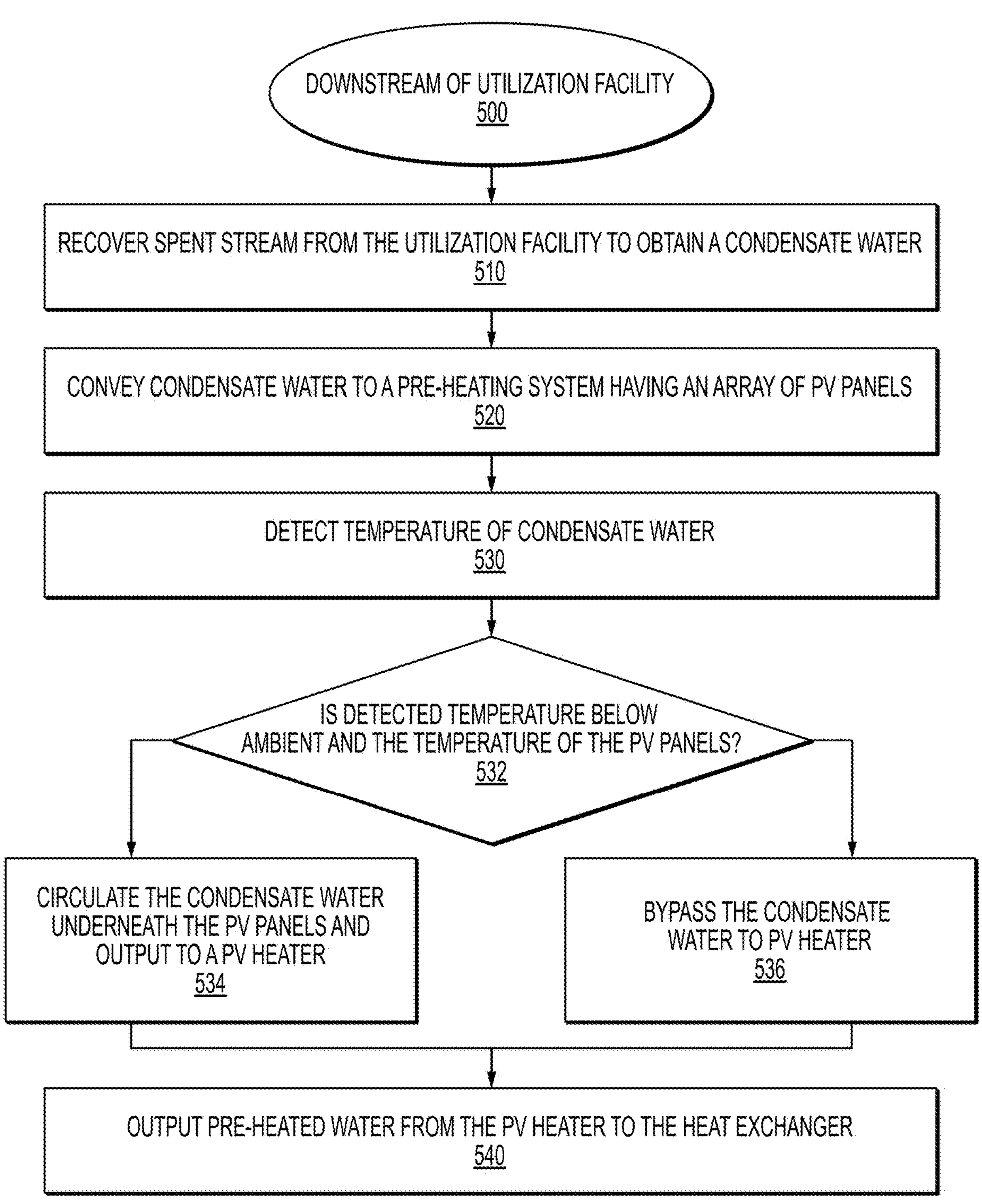
FIG. 5 is a flowchart diagram illustrating steps downstream of a utilization facility in a method for managing solar energy storage and production according to an embodiment.

FIGS. 4A and 4B are flowchart diagrams illustrating a method for managing solar energy storage and production 400 according to an embodiment (steps 410-480). As shown in FIG. 4A, in step 410, system 100 and models are initialized. For example, pattern data 305 and models 242-248 may be uploaded or stored. Initialization may also enable a user to select between a continuous mode and an intermittent mode of operation or automatically set the mode in accordance with a predetermined default.

Next incident radiation is collected with solar thermal collection unit 110 (step 420) which adds heat into a heat transfer fluid 105 (step 430). The heated heat transfer fluid is conveyed through a first thermal conduit to a heat exchanger 120 (step 440). Pre-heating with a photovoltaic pre-heating system 150 may also be added.

In step 450, heat energy is transferred at the heat exchanger 120 to a storage stream 122. For example, thermal energy from the heat transfer fluid and a pre-heated stream may be transferred to add thermal energy to the storage stream 122.

As shown in FIG. 4B, control proceeds to output the storage stream 122 with the added heat energy through another thermal conduit to aquifer thermal storage system 130 (step 460). In step 470, heat storage and operational characteristics of the aquifer thermal storage system 130 are monitored. For example, temperature may be detected near injector wells and between wells to ensure a balance in thermal storage is maintained. Chemical tracing of produced streams may also be monitored to ensure depleted wells are used for thermal storage.

In step 480, when a utilization facility 140 needs power, thermal energy in a thermal fluid in an aquifer is conveyed. The step may involve extracting a stream from aquifer thermal storage system 130 and outputting a drive stream 132 having the stored thermal energy to a steam generator 145. For example, a producer well (also called a production well) may output the thermal fluid (such as heated water) to steam generator 145 when the thermal fluid is above a temperature threshold. A second renewable pre-heating may also be added to further increase the efficiency of the method or ensure the output thermal fluid is above the temperature threshold when needed. For example, FIG. 5 is a flowchart diagram illustrating steps downstream of a utilization facility in a method for managing solar energy storage and production according to an embodiment (steps 510-540). Step 510 recovers a spent stream 142 from utilization facility 140. For example, the recovering may involve obtaining a condensate of steam emitted by steam generator 145. The condensate may then be conveyed to a photovoltaic pre-heating system 150 having an array of PV panels (step 520).

In step 530, the step detects the temperature of spent stream 142 recovered in step 520. A temperature sensor may be used to detect the temperature. A check is made to determine whether the detected temperature is below ambient and the temperature of the PV panels or a user set temperature (step 532). If yes, control proceeds to a step of circulating at least a part of the spent stream 142 underneath or near the array of photovoltaic panels when the detected temperature of the spent stream is below ambient and below the temperature of the array of photovoltaic panels (step 534), and otherwise bypassing the circulating (536).

After either of steps 534 and 536, a step of pre-heating occurs to obtain a pre-heating stream 152 for output to heat exchanger 120. For example, an electric heater powered by the photo voltaic system or from the utilization facility may be used to pre-heat the stream passing out of the photovoltaic pre-heating system. Also, the step of pre-heating may also include a step of periodically washing surfaces of photovoltaic panels in the photovoltaic pre-heating system with a spray device.

Solar Energy Storage Management of Aquifers with Wells

Figure 6:
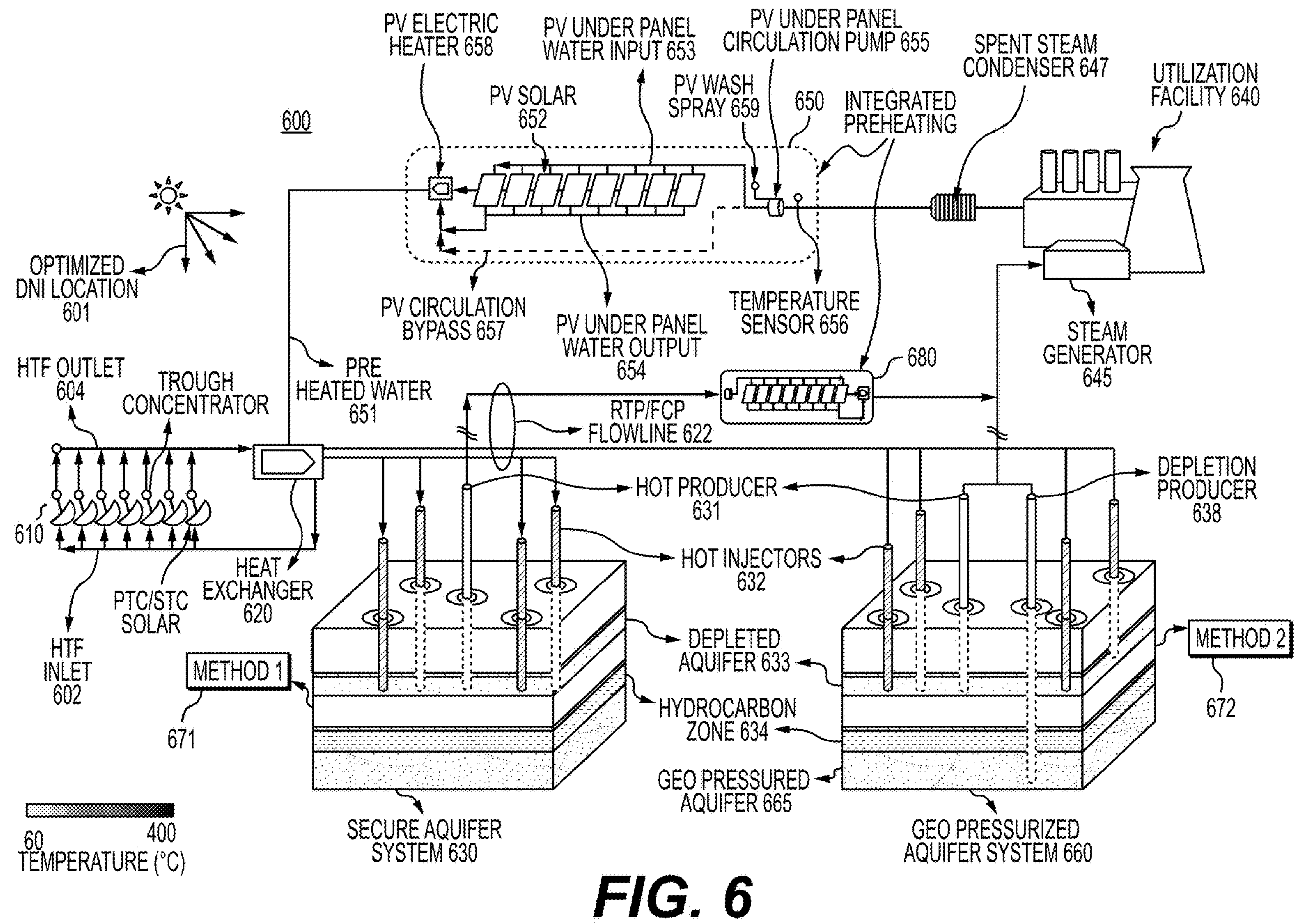
FIG. 6 is a diagram of a solar energy storage management system 600 in accordance with another embodiment.

FIG. 6 is a diagram of a solar energy storage management system 600 in accordance with another embodiment. The diagram of FIG. 6 shows piping between components and example aquifers with injectors wells and producer wells in further detail. System 600 includes a solar thermal collection unit 610 coupled to a heat exchanger 620. Solar thermal collection unit 610 includes an array of solar collectors. The array of solar collectors are oriented to receive incident radiation 601 from the Sun and concentrate the radiation onto a heat transfer fluid (HTF). The HFT may flow from an HTF inlet 602 in a thermal conduit along locations underneath solar thermal collection unit 610 toward an HTF outlet 604. The array of solar collectors are oriented at a desired angle relative to the location of the Sun to maximize the power concentrated as thermal energy to heat the circulating HTF. The angle of orientation for the solar collectors may be set or changed individually or as a group so the solar collectors can track movement of the Sun. A control algorithm operated by system manager 200 may be used. In addition to tracking and adjusting orientation, the control algorithm may calculate an estimate of the required surface area for the panels alongside the quantities and direction of alignment to sun rays.

In one example, sites with high solar direct natural irradiation (DNI) are selected to develop a concentrated thermal solar facility. A large scale use may have parabolic trough concentrators (PTC) in solar thermal collection unit 610. A site for system 600 may also include a secure aquifer system or hot geo pressurized aquifer in the vicinity of the optimal DNI area.

Heat exchanger 620 is coupled to a set of thermal pipes 622. A heat transfer fluid (such as water or steam) flows through one or more pipes 622 to one or more aquifer systems 630, 660 to allow subsurface storage of thermal energy. All or a part of the heat transfer fluid may also flow directly to steam generator 145 or to photovoltaic pre-heating system 652 if pre-heating is needed. In one example, a commercial heat exchanger 620 gathers low boiling point heat exchange fluids and contacts water from a water collector system where the heat is transferred for onward injection to aquifer storage.

Aquifer system 630 is a secure aquifer having a depleted aquifer 633 and hydrocarbon storage zone 634 that exist at different depths. A set of injector wells 632 may inject HTF or otherwise transfer thermal energy from pipes 622 into regions within depleted aquifer 633. One or more production wells 631 may output fluid or otherwise transfer thermal energy to a drive stream 644 to power a steam generator 645 in a utilization facility 640. The output fluid from aquifer 633 may pass through a photovoltaic pre-heating system 680 to add additional pre-heating or may pass directly to steam generator 645 if no pre-heating is needed. Utilization facility 140 can include any, but not is limited to, the following steam utilization systems: power generation, LNG regasification, sour gas treatment, water desalination, cooling, agricultural drying, hydrogen electrolysis etc.

Figure 7A:
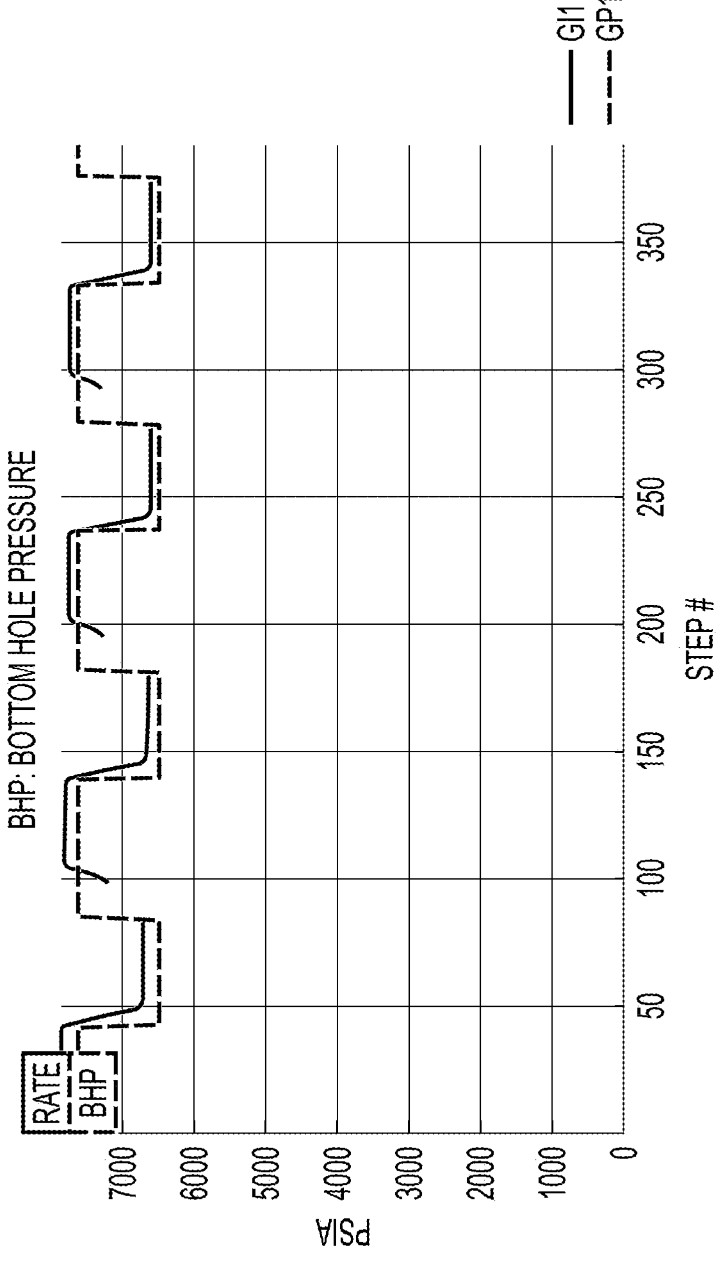
FIGS. 7A, 7B, 7C and 7D are diagrams illustrating aspects of system performance in an example simulation.

In a first method of operation (method 1), fluids from heat exchanger 620 are injected into depleted aquifer 633 for storage. The depleted aquifer 633 and the progression of the thermal energy storage process may be monitored by system manager 200 using an aquifer modeling tool to ensure containment of pressure, injected heat and progression of the heat storage as shown in examples in FIGS. 7A-7D. Specifically, system 600 may monitor pressure in aquifer 633 and manage injection controller 210 to run such that there is minimal or no difference in the pressure between the injection wells 632 and production wells 631. The graphical diagram in FIG. 7A shows respective plots of the bottom hole pressure (bhp) in psia (psi absolute) units over different steps (Step #) for the injection wells GI1 and production wells GP2. As shown in FIG. 7A, the system can be run such that there is minimal or no difference in the pressure between the injection wells GI1 and production wells GP2.

Figure 7B:
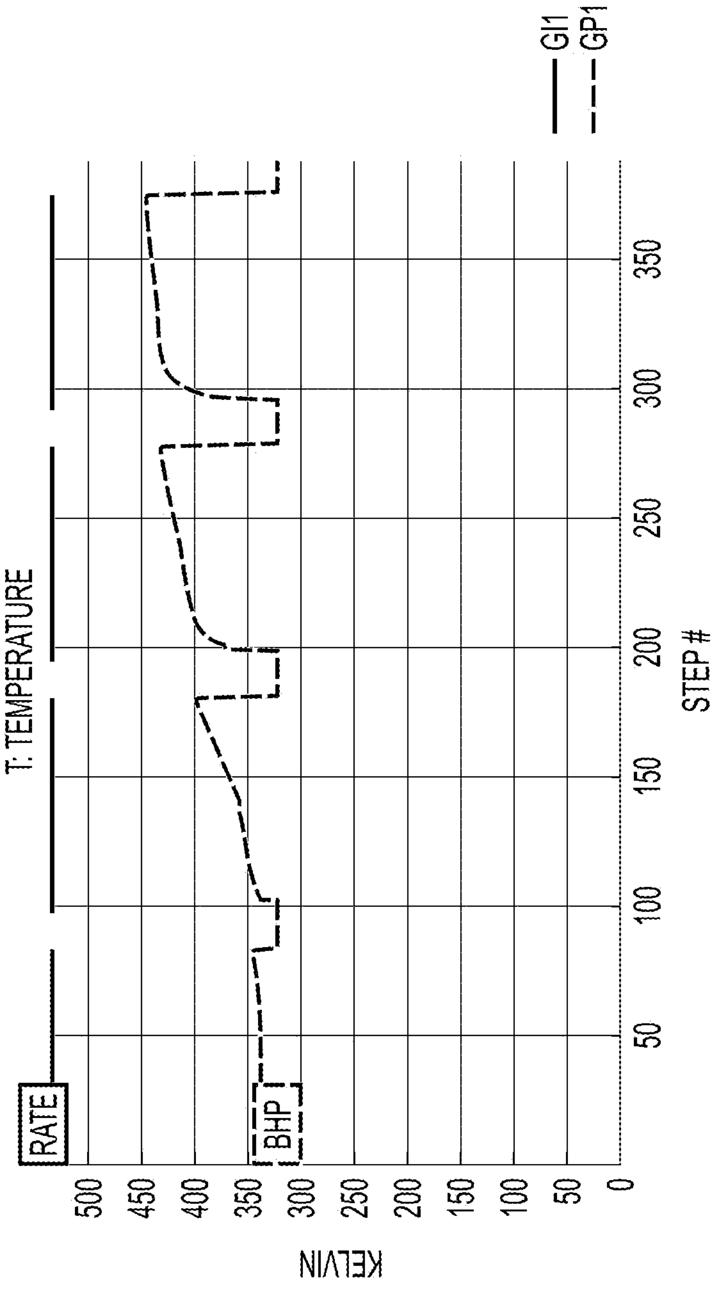
Figure 7C:
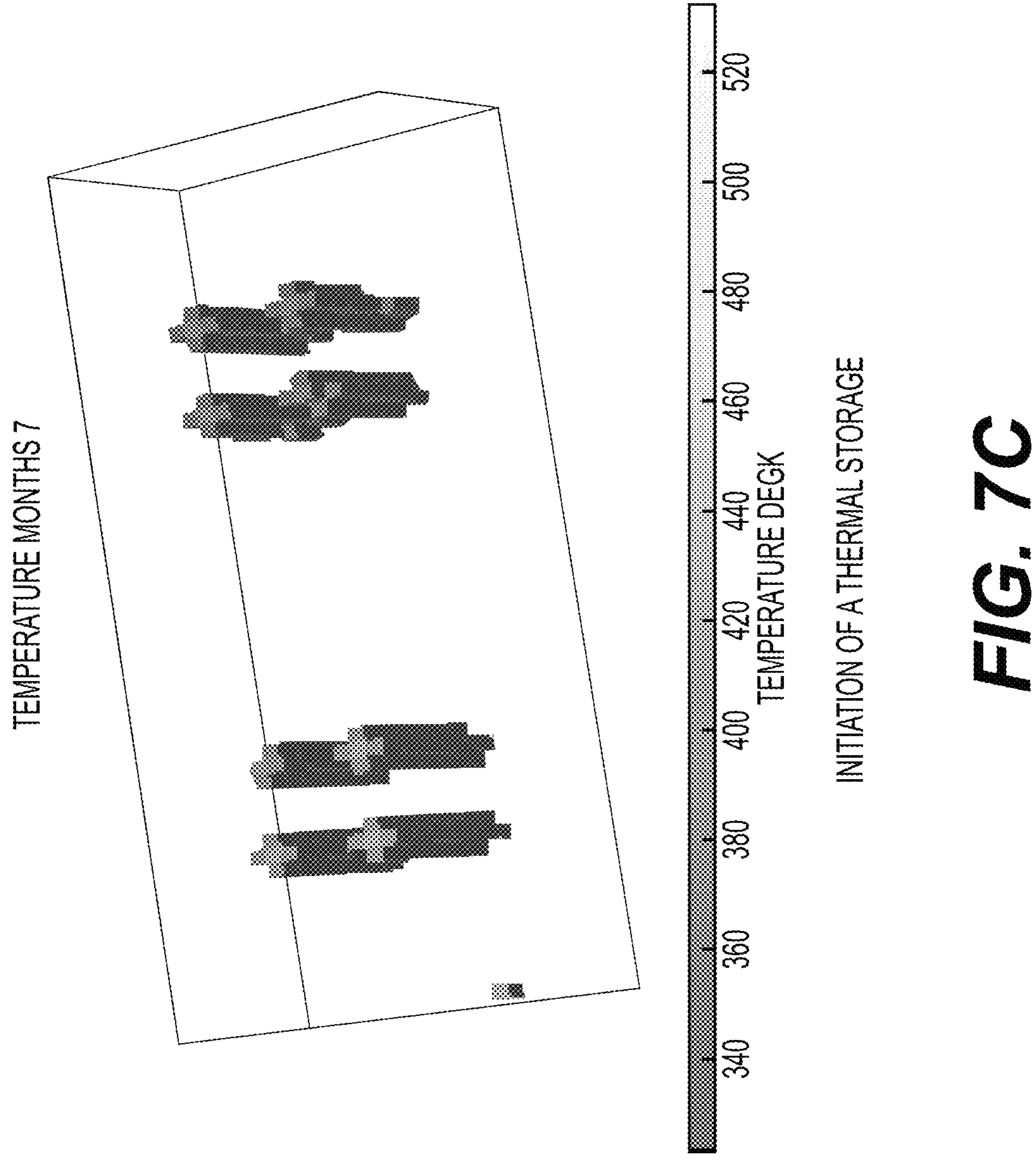
Figure 7D:
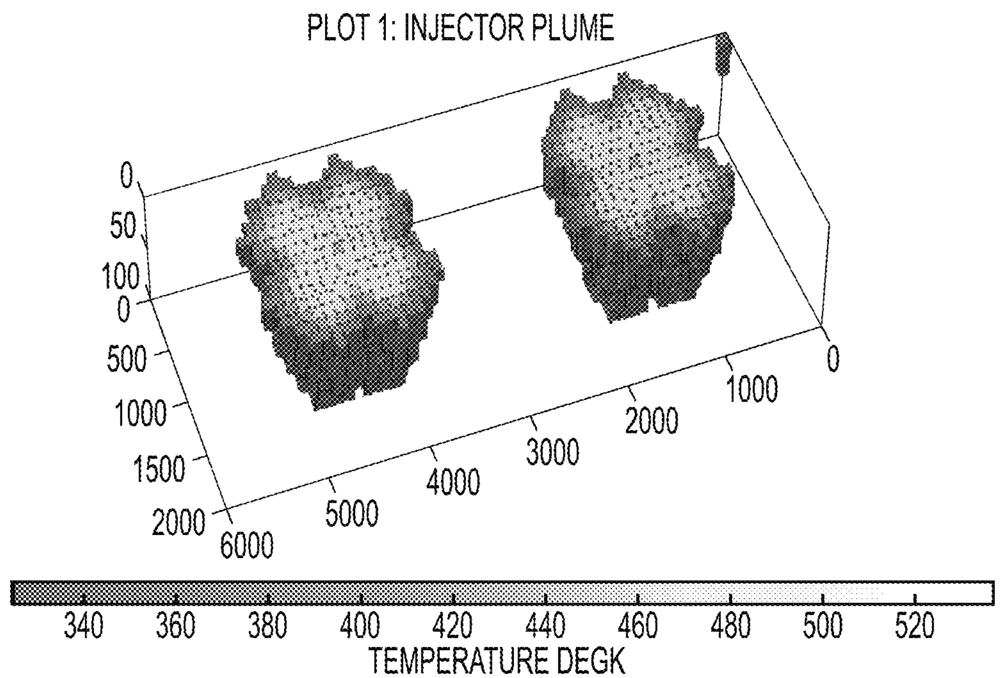

In addition to pressure, system manager 200 can also monitor thermal growth of the heat stored in aquifer system 633 as shown in the diagram in FIG. 7B. The graphical diagram in FIG. 7B shows thermal growth of the storage in depleted aquifer 633 with plots of the temperature (degrees Kelvin) and bottom hole pressure (bhp in units of bar or psi). System manager 200 can also monitor injected heat stored in aquifer system 633 as shown in the diagram in FIG. 7C. The graphical diagram in FIG. 7C shows initiation of thermal storage in depleted aquifer 633 with plots of the temperature (degrees Kelvin) for different injector wells at a time (month 7).

In a further feature, for temperature containment in the storage, the injector wells are designed and perforated oriented to the direction of the production wells. With oriented perforation, and continuous production, heat is directed to and contained within an intended area of the aquifer system 633 as demonstrated by a modelled example in FIG. 7D.

Aquifer system 660 has a geo-pressurized aquifer 665 located beneath subsurface layers including a depleted aquifer 633 and hydrocarbon storage zone 634. A set of injector wells 632 may inject HTF or otherwise transfer thermal energy from pipes 622 into regions within depleted aquifer 633 in system 660. Production wells 631 that draw from depleted aquifer 633 and geopressurized aquifer 665 may output fluid or otherwise transfer thermal energy to a drive stream 644 to power a steam generator 645 in a utilization facility 640. The output fluid from depleted aquifer 633 or geo-pressurized aquifer 665 may pass through a photovoltaic pre-heating system 680 to add additional pre-heating or may pass directly to steam generator 645 if no pre-heating is needed.

In a second method of operation (method 2), a reservoir managing approach mitigates the risk of early or unintended water breakthrough that can be characteristic of a geopressured aquifer 634 when they exist below hydrocarbon bearing reservoirs 634. In an example, geo pressured aquifer 634 may be a system with pressure above standard water gradient in psi/ft or other units of pressure per unit length. It is further characterized by a higher than normal thermal gradient that makes it a suitable source of hot fluids for geothermal utilization. In method 2, the geo pressured aquifer 634 has fluid initially flowed to surface from the production well 638 and can be sent directly to a utilization facility 640 or goes through photovoltaic pre-heating system 680 to heat exchanger 620 and subsequently goes through a similar process as described for method 1 for storage into a separate depleted reservoir 633.

In an implementation of method 2, system manger 200 performs continuous reservoir monitoring of geopressurized aquifer 665 using pressure measurements and saturation maps and energy plots to see the energy impact of the aquifer on a hydrocarbon producing zone 634 reservoir. If the geopressurized aquifer 660 is a risk to the hydrocarbon recovery, then production to remove significant volumes of water is conducted using production well 638 to ensure the health of the hydrocarbon bearing reservoir (zone 634) by delaying the breakthrough of water into the hydrocarbon reservoir.

In examples, production wells 631, 638 are intended to produce stored high enthalpy water from the storage in aquifer system 630 and an existing geo pressurized aquifer 634.

In a further feature, spent steam from utilization facility 640 is captured by a condenser 647. Condensates from condenser 647 are of lower temperature after heat absorption by the utilization facility 640. Condenser 647 outputs the spent steam condensate to a photovoltaic pre-heating system 650 which generates a pre-heated stream 651 (such as water or steam). Pre-heated stream 651 is output to heat exchanger 620 to add more thermal energy for thermal storage in aquifer systems 630, 660 or for a drive stream 644.

In a further embodiment, photovoltaic pre-heating systems 650, 680 are each powered by solar energy or the existing utilization facility. For example, photovoltaic pre-heating system 650 may include an array of photovoltaic panels 652 configured to generate electrical power in response to incident radiation. A spray device 659 is configured to periodically spray at least a part of a spent stream from condenser 647 onto array of photovoltaic panels 652 to wash surfaces of the panels.

A pump 655 is configured to circulate at least a part of the spent stream from condenser 647 to input 653 to pass underneath or near array of photovoltaic panels 652 through output 654. An electric heater 685 is configured to add heat to the circulating spent stream to obtain pre-heated stream 651 output to heat exchanger 651. Each of the spray device 659, pump 655, and electric heater 658 are operated with the electrical power generated by the array of photovoltaic panels 652 or the utilization facility 680. A temperature sensor 656 may also be added to provide further control of operation based on the detected temperature. For example, a bypass switch 657 may be switched to circulate at least a part of the spent stream underneath or near the array of photovoltaic panels when the detected temperature of the spent stream is below ambient and below the temperature of the array of photovoltaic panels 652 to add heat, and otherwise bypassing circulating when the detected temperature is above ambient and above the panel array temperature and heat does not need to be added.

Photovoltaic pre-heating system 680 may have the same components and operation as described with respect to photovoltaic pre-heating system 650.

In another feature, set of pipes 622 may be thermal pipes made up of Reinforced Thermal Pipe (RTP) or Flexible Composite Pipe (FCP) pipe connections to further reduce heat loss and provide even more efficient subsurface thermal storage and more efficient extraction of thermal energy to drive steam generator 145.

In one embodiment, condensates are piped using either standard piping or RTP/FCP if required to an integrated photovoltaic pre-heating system 650. The integrated preheating is advantageous. An increase in temperature on photovoltaic (PV) panels from high solar irradiation combined with high dust cover on the panel surface can reduce the efficiency and lifespan of PV panels. Therefore, the water-cooled system 650 is intended to mitigate panel overheating by circulating water through specially developed aluminum or other highly conductive heat sink that is part of the base of the panels as described above. The surface wash or spray device 659 is designed to reduce dust cover for further PV efficiency enhancement.

In one example, photovoltaic pre-heating system 650, 680 each consist of a temperature sensor 656 that checks the condensate (water) temperatures. If the water temperature is below ambient, PV panel temperature or a user defined temperature, the condensate is then circulated as coolant and pumped using pump 655 to underneath the panels to enhance panel cooling and increase PV operating efficiency. Irrespective of water temperature, some water is retained for the spray device 659 for washing. The cooling water (condensate) is sent underneath the panels, cools the panels and the output water is sent to with a temperature gain. From the output of bypass switch 657, water is sent to one or more electric powered water heaters 658 that utilize PV generated electricity to enhance or maintain the water temperature. If the water temperature is above ambient and PV surface temperatures, then bypass switch 657 is set in a bypass mode to divert water directly to PV electric heater 658 where it is heated with electricity from the PV pre-heating system 652. Preheated water 651 is then sent back to heat exchanger 620 and the process is repeated.

In operation, system 600 may utilizes either of the reservoir types for the two methods 1 and 2. Method 1 can be used for a depleted aquifer or natural aquifer. Method 2 can be used for a high pressure geopressured aquifer. The choice of method 1 or 2 depends upon the presence or absence of the hot geo pressurized aquifer system. Application of method 2 aids the management and exploitation of geopressured aquifers to manage the onset and effects of water breakthrough to producing reservoirs. Depending on the operating temperatures or enthalpy range achieved from the subsurface storage systems, the heat produced from these methods can be utilized for water desalination, electricity generation, natural gas processing, agricultural purposes, cooling etc.

Using a system 100, 600 with the corresponding prediction methodology drawn from model library 240 can optimize and extend the producing time of STC facilities and compensate or support peak shaving for nearby power grids or thermal uses. Achieving continuous long-term operations requires management of water intake and offtake volumes that ensure adequate pressure maintenance is achieved for these reservoirs. This can be done using an integrated computer application in system manager 200 as described herein. In one configuration, system 100, 600 can produce from hydrocarbon aquifers to mitigate unwanted water breakthrough and use STC to heat these produced fluids for storage in nearby depleted TES. The system can be operated in either as continuous injection with production or with seasonality. The seasonal system operating can consist of only thermal production from all wells during winter/cold season and only thermal storage with all wells and the use of integrated pre heating during the summer/hot seasons.

Further Discussion and Advantages

Advantages and benefits are further discussed with respect to embodiments and examples not intended to be necessarily limiting. Systems 100, 600 and method 400 in embodiments can achieve a number of advantages. The combination of solar thermal collection unit (STC 110, 610) and solar technologies for pre-heating (photovoltaic pre-heating system 150, 152, 650, 680) generates thermal energy with renewable energy sources. The thermal energy is stored in aquifer thermal storage systems 130, 630, 660 to provide a source of renewable power generation.

In this way, thermal energy can heat up spent steam condensate or water streams obtained from subsurface reservoir aquifers 130, 630, 660. Using solar thermal collection concentrates solar heat into a heat transfer fluid (HTF) at surface solar facilities. A heat exchanger 120, 620 transfers the heat from the HTF to either a PV pre heated water stream or direct water stream obtained from geopressured aquifers or reservoirs. The pre heated water stream may be spent or produced water from any energy utilization facility such as a power station and can be circulated underneath PV panels to cool the panels and increase their PV efficiency while also raising or sustaining the temperature of the water stream prior to flowing to a heat exchanger. The system described herein may further enhance the efficiency of PV pre-heating systems with the use of a dust wash mechanism that utilizes some part of the spent water streams to spray and wash panel surfaces to increase PV conversion efficiency.

Downstream of a heat exchanger, heated water is injected and stored in depleted geological aquifers to create a high-capacity Thermal Earth Energy Storage (TEES), such as, either of aquifer thermal storage systems 130, 630, 660. Depending on the heating temperature achieved in the TEES (that can reach 400 deg C. supercritical), the heated water in the TEES is then reproduced into energy utilization options that can range from liquid natural gas (LNG) regasification systems, desalination plants, district cooling, agricultural heating application, organic ranking cycle power systems and natural acid gas treatment. The solar energy management storage system can function in continuous injection and production mode into the reservoir to provide a base load for solar facilities or can function in a "huff and puff" pattern if needed for peak seasonal thermal energy demand during periods of low or unavailable solar irradiation at thermal powered facilities.

Aims of this system design in examples may be to achieve any or a combination of the following:

i. Utilize the spent water from a chosen utility option for natural water circulation underneath the PV panels to cool the PV panels and if the spent water is of low salinity, this can be used to periodically wash the surface of the PV and STC systems. This maximizes the injected water temperature and minimizes heat losses in the HTF and heat exchange system. Water circulation cooling and surface cleaning of PV systems using water can increase PV electricity production efficiency by up to 12%. The electricity generated from the PV is then used to further heat the spent water before it is sent to the heat exchanger as pre heated water.

ii. Manage reservoir systems by using this method to reduce the drive energy of hot geopressured aquifers that exist beneath producing hydrocarbon reservoirs. This is done by producing off aquifer water into solar heating farms and injecting such heated water into different depleted reservoirs for TEES. This design is intended to delay the onset of water breakthrough in such producing hydrocarbon fields and maximize the reserves recovery from assets that also increases the economic value of the asset.

iii. Utilize sedimentary or tight reservoir aquifers to create a longer lasting thermal battery or synthetic geothermal reservoir that eliminates the need of a shallow saline or salt-based heat storage. This enhances the producing time or efficiency of solar facilities to meet base load producing time of 24 hrs. as needed by energy customers. This also replaces shallow thermo chemical storages with the proposed method in hot dry rocks, sedimentary aquifers and enhanced geothermal systems that include suspended repurposed oil or gas producers.

iv. Utilize single or multiple spot injection to production wells pattern or configuration consisting of central production wells surrounded by water injector wells with the purpose of constraining the total heat energy of the system in the vicinity of the wells within the specified aquifer or non-hydrocarbon bearing reservoir.

v. Injector wells may have an oriented perforation towards the producer wells to maximize water and thus heat transfer towards the production system. In the cases of tight reservoirs, the productivity of the injector wells is enhanced by proppant hydraulic fractures through the oriented perforations. The same enhancements may be done for production wells in tight aquifers.

vi. Configure multiple injector and production wells in storage patterns such as 5×1 or, 8×2 injection production configurations for heat storage, production and water volume management in a reservoir model. Alternative configurations can also be central injectors with circumference production wells.

Electronic control may also be used in system manager 200 to control injection and extraction and manage models with respect to either solar energy storage management system 100, 600 as described herein. System manager 200 may be designed and optimized with a computer application that can simultaneously estimate, optimize and synergize STC heat generation rates. Further objectives may be attained as follows in embodiments:

i. Use an insulated well design having synthetic foam or gas filled annuli to reduce thermal losses through water refluxing or heat losses to the surrounding wellbore. This can maximize heat injection rates into reservoirs and reduce well count or requirements.

ii. Use a fiber optic distributed temperature system (FODTS 320) for controlled injection across the reservoir intervals through inflow control devices and oriented perforations to ensure even heat transfer across reservoir zones by connecting desirable formation properties.

iii. Deploy inner bore or retrievable water marking chemical tracers (tracers 306) to monitor intra-reservoir communication between thermal storage wells, aquifer management wells and geothermal producers. This is more critical in the case of aquifer depletion to ensure that the only the target aquifer is depleted and heat storage is constrained within the intended storage zone.

iv. A computer application for system manager 200 may be parameterized using one or more of the following models:

- a surface solar thermal collection model 242 to estimate solar generated heat rate and coupled to an external geothermal reservoir model such as numerical models, material balance models and then predict thermal energy that can be stored for the specific reservoir.
- a surface water desalination model 244 coupled to an external geothermal reservoir model such as numerical models, material balance models and then predict usable heat produced from the reservoir storage model.
- a thermal to electrical energy model 246, coupled to external surface solar thermal collection model 242 and a subsurface geothermal reservoir model such as numerical models, material balance models, to predict useable heat and electricity produced from the reservoir storage model.
- non-linear optimization models 248 within an integrated workflow to simultaneously estimate reservoir void replacement and maintain heat storage to achieve continuous heat storage and production system as required by heat demand.

Figure 8:
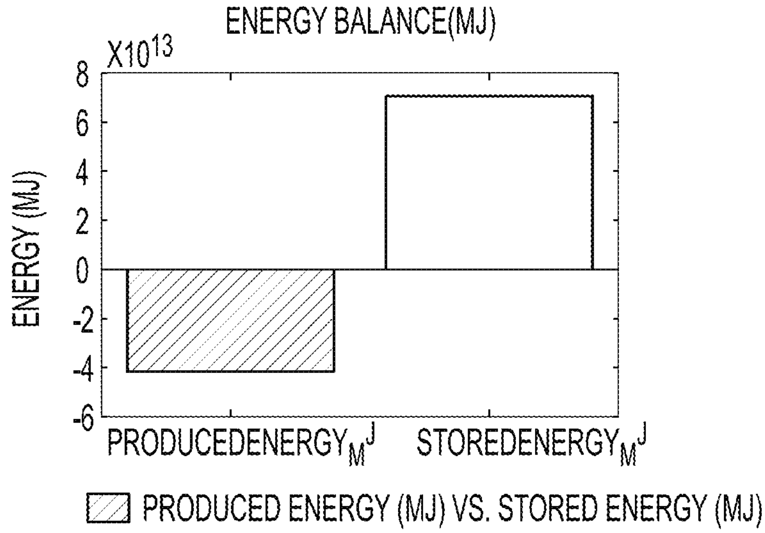
FIG. 8 is a diagram of energy balance generated in one example simulation.

In one embodiment, a computer algorithm in system manager 200 may be used to monitor energy balance and performance of solar energy storage management system 100, 600. The energy balance or system efficiency is quantified by the total enthalpy of stored energy vs total enthalpy of produced energy. An example of this is demonstrated in the graphical diagram of energy balance in FIG. 8 generated in one simulation which shows the relative amounts of energy produced and energy stored in mega-joules (MJ) units.

Figure 9:
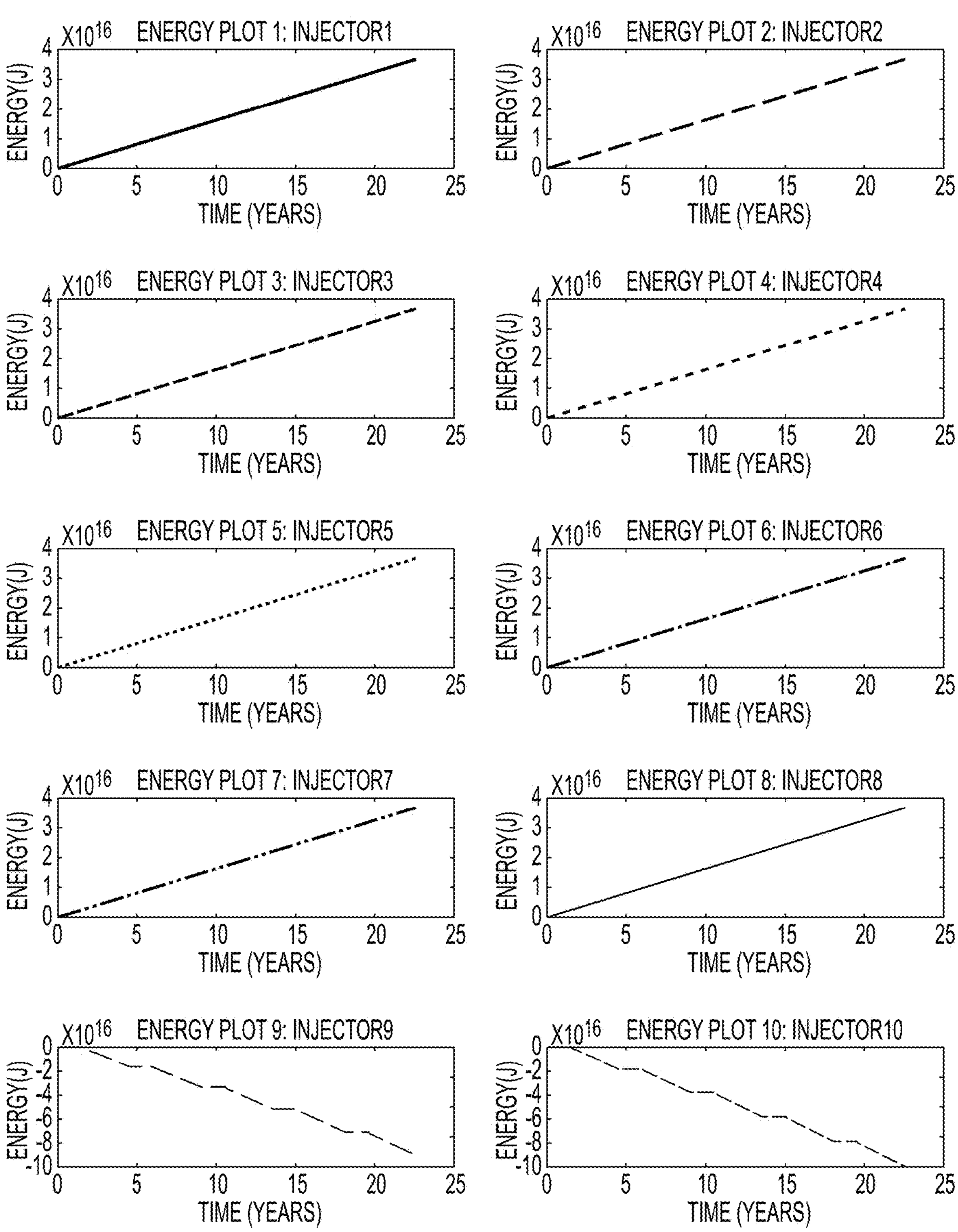
FIG. 9 shows ten graphical diagrams of energy plots for respective wells generated in one example simulation.

Also, a computer algorithm may be used to monitor energy performance of the system 100, 600 at well level. The energy balance or system efficiency is quantified by the cumulative enthalpy for the injection wells and the cumulative enthalpy for the production wells. An example of this energy performance is demonstrated in ten graphical diagrams shown in FIG. 9 and generated in one simulation according to an embodiment. In FIG. 9, energy plots 1-8 show an increase in thermal energy stored in MJ units over a period of years for eight respective injector wells according to a simulation. Energy plots 9-10 show a decrease in thermal energy stored in MJ units over a period of years for two production wells (or producer wells) according to the simulation.

Figure 10:
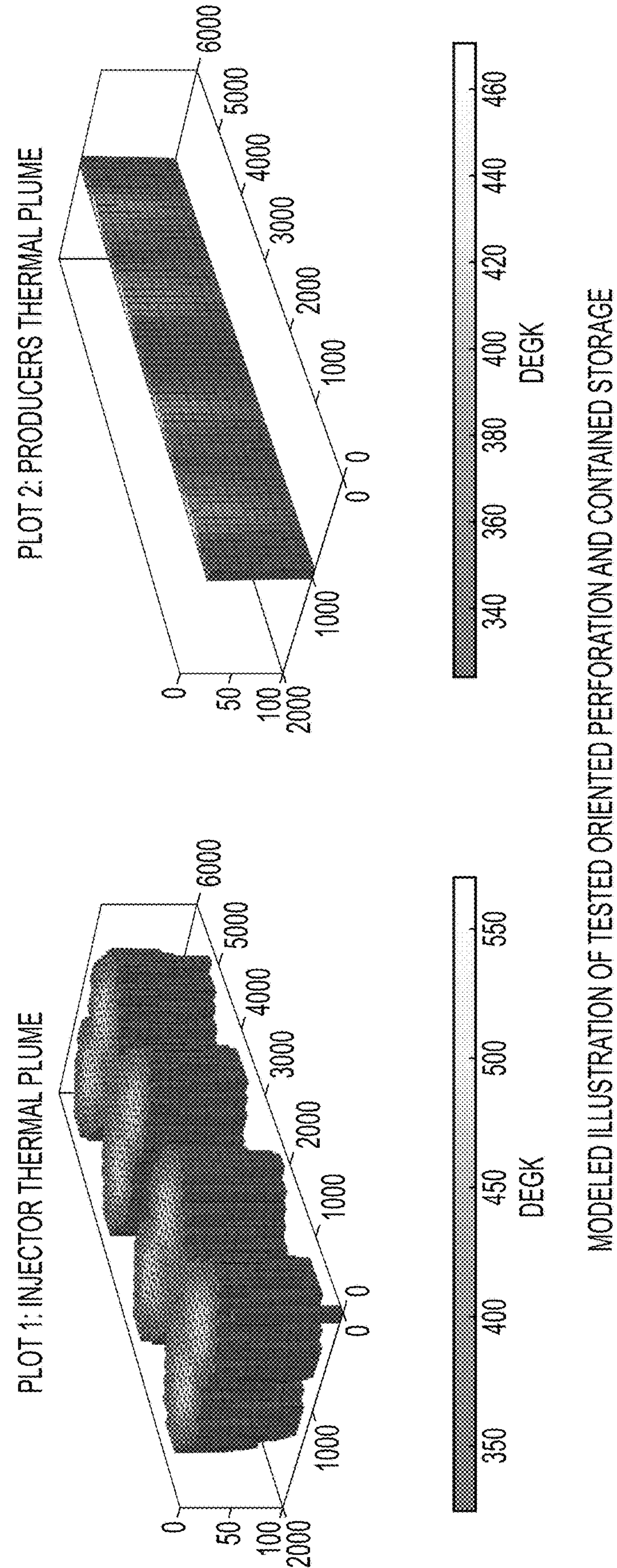
FIG. 10 shows two graphical diagrams of thermal energy plots in an injector well plume and a producer well plume of an aquifer thermal energy storage system having oriented perforation and contained storage managed in an example simulation.

Finally, FIG. 10 shows two graphical plots of thermal energy (temperature degrees Kelvin) in an injector well plume (Plot 1) and a producer well plume (Plot 2) of an aquifer thermal energy storage system having oriented perforation and contained storage managed in a test simulation.

In embodiments described herein technical solutions are obtained. Solar energy storage management systems 100, 600 and method 400 in some embodiments may maintain continuous baseload from solar facilities by the use of controlled injection and production storages. Combining solar concentration technology, PV systems and pipe technologies enhances heat generation, transmits the same heat into depleted reservoirs using specific well configurations to ensure a contained heat storage. Compensation for convection losses to the ambient environment is achieved by the use of pre heated PV systems and conduction losses through low heat conducting pipes. Enhanced reservoir management and recovery occurs for hydrocarbon fields that lie above and are at risk of premature water breakthrough due to geopressured reservoirs.

A number of technical problems are also overcome by the solar energy storage management systems and methods described in embodiments herein. First, an increase in the efficiency of solar renewable technology is achieved by maximizing heat recovery and storing heat during periods of low utilization for use during low solar irradiance time. Second, losses in a solar concentration system due to convection to the ambient environment and conduction through physical piping are overcome by use of pre-heating and added thermal energy and use of RTP or FTC pipe connections and other system optimizations described herein. Third, the issue of variable source solar facilities not meeting base load requirements of energy users is solved by providing systems 100, 600 and method 400 which provide renewable thermal energy storage for continuous use. Fourth, the levelized cost of energy for solar projects is reduced by augmenting solar energy production by using a sustainable long-term thermal storage system that meets base load requirements and reduces the levelized cost of energy for solar energy projects.

Fifth, the onset of water breakthrough is avoided or postponed which increases reservoir hydrocarbon recovery (EUR) by a method to manage the onset or the impact of water breakthrough from geopressured aquifers that are beneath hydrocarbon bearing reserves. This is done by producing the water volumes from such aquifers to reduce their strength, utilize the produced water as feed into STC heating systems and store such heated water in other depleted reservoirs. Sixth, heat and dust inefficiencies are reduced for PV panels through natural under panel cooling system using spent water which also utilizes some spent water for periodic surface cleaning post desalination at a site. Seventh, thermal earth storage efficiency is increased by containing the heat energy stored in the depleted aquifer through the use of pattern and oriented injector/producer well configuration. Last, the use of other higher cost ground heat storage systems such as pressurized hot water tanks, hot oil/rock storage vessels and molten salt, can be reduced.

Subsurface Thermal Storage

In further embodiments, aquifer thermal storage system 130 may be any subsurface thermal storage system. In one feature, aquifer thermal storage system 130 may be an aquifer thermal earth storage (ATES) that utilizes a pair of production and injector wells to inject heated fluids mainly water into sedimentary porous aquifers contained within impermeable barriers. Thermal energy is stored by a combination of rock and pore fluids through heat absorption. Thermal and hydrological balance is preferably achieved at all times within the aquifer to ensure extended use of this system.

In still further embodiments, aquifer thermal storage system 130 may store thermal fluid in bores or caverns. Borehole Thermal Earth Storages (BTES) may be used that utilize vertical wellbores drilled to shallower depths than ATES. Heated fluids are injected to these bores to raise the temperature of large thermal banks of soil around these bores and extract fluid as required. Aquifer thermal storage system 130 may store thermal fluid in caverns. A Cavern Thermal Energy Storage system (CTES) that utilizes caverns or decommissioned mines may be used where heated fluids are flooded into the storages and extracted as required.

Well Systems and Design

In embodiments, the production and injection wells are designed to reduce heat loss. To minimize heat loss, Reinforced Thermal Pipe (RTP) or Flexible Composite Pipe (FCP) pipe connections are utilized from heat exchanger 620 to a well injection manifold and from a production manifold to one or more steam generators 645.

Annuli management systems may also be used. Wellhead sensors with gate valves for continuous humidity and pressure monitoring of A-annuli. Continuous annuli pressure monitoring can be done to manage incidences of high pressure in an annuli system and cycling of annuli insulation gas due to water refluxing or oxygen ingress.

Insulated annuli may be added to production and injection wells. A well A-annuli is completed with high pressure non-chemical reactive diatomic gas such as nitrogen or air with negligible oxygen content. This may be needed to add thermal insulation of the injection tubing, reduce steam refluxing or steam back flow that can occur due to water ingress from tubing connectors, reduce thermal stresses generated during injection operations to avoid casing collapse and eliminate corrosion risk due to potential reactive waters. The base of the gas filled annuli is protected using high thermal gaskets.

Annuli temperature sensing may be performed as part of system management. Continuous optoelectronic temperature and pressure measuring cables installed externally of the production tubing for monitoring annuli temperature conditions and potential steam refluxing in the annuli. Telemetry can utilize commercially available digital temperature sensing (DTS) systems. In one option, external installation is used to ensure equipment can operate within low temperatures of the wellbore annuli and not in direct contact to high temperature reactive waters.

For flow and streamline tracking, an inner bore and retrievable pre-installed water marking chemical tracer carrying assembly is added. This is installed at a depth determined by the degradation temperature of the polymeric or chemical tracer. The tracers are intended to monitor intra-reservoir communication between thermal storage wells, aquifer management wells and geothermal producers (production wells). A tracer mandrel is retrievable for periodic reconfiguration of tracers.

Example Computing Environment

Figure 11:
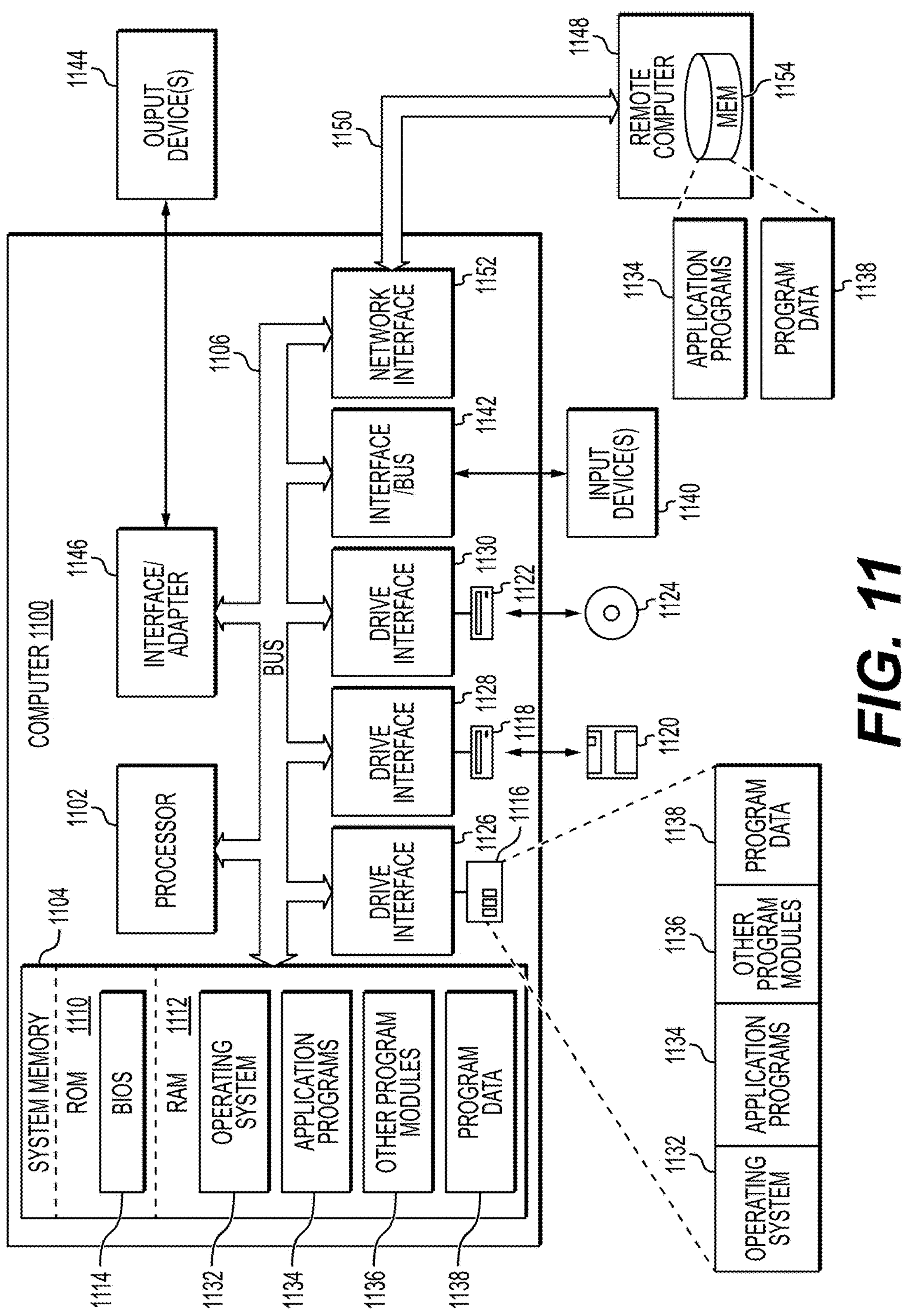
FIG. 11 is a diagram of a computer system that can be employed to execute one or more embodiments of the present disclosure.

FIG. 11 depicts an example computing environment that can be used in systems and methods according to embodiments.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system of FIG. 11.

In this regard, FIG. 11 illustrates one example of a computer system 1100 that can be employed to execute one or more embodiments of the present disclosure. Computer system 1100 can be implemented on one or more general purpose networked computer systems, embedded computer systems, routers, switches, server devices, client devices, various intermediate devices/nodes or standalone computer systems. Additionally, computer system 1100 can be implemented on various mobile clients such as, for example, a personal digital assistant (PDA), laptop computer, pager, and the like, provided it includes sufficient processing capabilities.

Computer system 1100 includes processing unit 1102, system memory 1104, and system bus 1106 that couples various system components, including the system memory 1104, to processing unit 1102. Dual microprocessors and other multi-processor architectures also can be used as processing unit 1102. System bus 1106 may be any of several types of bus structure including a memory bus or memory controller, a peripheral bus, and a local bus using any of a variety of bus architectures. System memory 1104 includes read only memory (ROM) 1110 and random access memory (RAM) 1112. A basic input/output system (BIOS) 1114 can reside in ROM 1112 containing the basic routines that help to transfer information among elements within computer system 1100.

Computer system 1100 can include a hard disk drive 1116, magnetic disk drive 1118, e.g., to read from or write to removable disk 1120, and an optical disk drive 1122, e.g., for reading CD-ROM disk 1124 or to read from or write to other optical media. Hard disk drive 1116, magnetic disk drive 1118, and optical disk drive 1122 are connected to system bus 1106 by a hard disk drive interface 1126, a magnetic disk drive interface 1128, and an optical drive interface 1130, respectively. The drives and associated computer-readable media provide nonvolatile storage of data, data structures, and computer-executable instructions for computer system 1100. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and disclosed herein. A number of program modules may be stored in drives and RAM 1110, including operating system 1132, one or more application programs 1134, other program modules 1136, and program data 1138. In some examples, the application programs 1134 can include one or more modules (or block diagrams), or systems, as shown and disclosed herein. Thus, in some examples, the application programs 1134 can include system manager 200.

A user may enter commands and information into computer system 1100 through one or more input devices 1140, such as a pointing device (e.g., a mouse, touch screen), keyboard, microphone, joystick, game pad, scanner, and the like. These and other input devices are often connected to processing unit 1102 through a corresponding port interface 1142 that is coupled to the system bus, but may be connected by other interfaces, such as a parallel port, serial port, or universal serial bus (USB). One or more output devices 1144 (e.g., display, a monitor, printer, projector, or other type of displaying device) is also connected to system bus 1106 via interface 1146, such as a video adapter.

Computer system 1100 may operate in a networked environment using logical connections to one or more remote computers, such as remote computer 1148. Remote computer 1148 may be a workstation, computer system, router, peer device, or other common network node, and typically includes many or all the elements described relative to computer system 1100. The logical connections, schematically indicated at 1150, can include a local area network (LAN) and a wide area network (WAN). When used in a LAN networking environment, computer system 1100 can be connected to the local network through a network interface or adapter 1152. When used in a WAN networking environment, computer system 1100 can include a modem, or can be connected to a communications server on the LAN. The modem, which may be internal or external, can be connected to system bus 1106 via an appropriate port interface. In a networked environment, application programs 1134 or program data 1138 depicted relative to computer system 1100, or portions thereof, may be stored in a remote memory storage device 1154.

Although this disclosure includes a detailed description on a computing platform and/or computer, implementation of the teachings recited herein are not limited to only such computing platforms. Rather, embodiments of the present disclosure are capable of being implemented in conjunction with any other type of computing environment now known or later developed.

The present disclosure is also directed to the following exemplary embodiments, which can be practiced in any combination thereof:

Embodiment A: A solar energy storage management system, comprising: a solar thermal collection unit configured to collect incident radiation and add heat into a heat transfer fluid; a first photovoltaic pre-heating system configured to pre-heat a spent stream from a utilization facility to generate a first pre-heated stream; and a heat exchanger configured to convey heat from the heat transfer fluid and the first pre-heated stream to a storage stream for output to an aquifer thermal storage system. Embodiment A may have one or more of the following additional elements A1-A15 in any combination or all in combination: Element A1: wherein the first pre-heating system includes: an array of photovoltaic panels configured to generate electrical power in response to incident radiation; a spray device configured to spray at least a part of the spent stream from the utilization facility onto the array of photovoltaic panels to wash surfaces of the panels; a pump configured to circulate at least a part of the spent stream from the utilization facility underneath or near the array of photovoltaic panels; and an electric heater configured to add heat to the spent stream to obtain the first pre-heated stream output to the heat exchanger, wherein each of the spray device, pump and electric heater are operated with the electrical power generated by the array of photovoltaic panels. Element A2: wherein the first pre-heating system further includes a temperature sensor. Element A3: wherein the aquifer thermal storage system has an aquifer with one or more injector wells and one or more production wells, and wherein the storage stream passes through the injector wells for storage in the aquifer and thermal energy in the storage stream is stored in the aquifer for later extraction through the production wells, whereby a drive stream having the stored thermal energy can be used to drive a steam generator at the utilization facility; and wherein the aquifer includes at least one of a depleted aquifer or a geopressurized aquifer, and wherein the geopressurized aquifer is located subsurface below a hydrocarbon zone in sedimentary rock.

Element A4: further comprising a second photovoltaic pre-heating system configured to add heat to a stream extracted from the production wells to generate the drive stream. Element A5: wherein the injector wells further include an oriented perforation towards the production wells to further improve heat transfer. Element A6: wherein the injector wells and the production wells are arranged in a pattern having a central production well surrounded by a set of injector wells, whereby, heat energy is further constrained within the aquifer in the vicinity of the central production well and surrounding injector wells. Element A7: wherein the injector wells and the production wells are arranged in pattern having multiple injector wells per production well. Element A8: further comprising a system manager, implemented on at least one processor, wherein the system manager includes: an injection controller configured to control injection of the storage stream output from the heat exchanger into the injection wells; and a mode selector configured to operate in either a continuous mode or an intermittent mode such that the injection of the storage stream into the injection wells and output through the producer wells occurs continuously during operation to provide a baseload to the utilization facility in the continuous mode or occurs during periods when operation is needed to meet demand to provide a baseload to the utilization facility in the intermittent mode.

Element A9: further comprising: a fiber optic distributed temperature system configured to detect temperature in different areas near the injector wells and producer wells within the aquifer; and a tracer monitor configured to monitor a set of chemical tracers near the injector wells and producer wells within the aquifer, wherein the system manager is configured to process input from the fiber optic distributed temperature system and send a control signal to the injection controller to control injection of the storage stream in respective injection wells to balance temperature differences across the aquifer, and wherein the system manager is further configured to process input from the tracer monitor and send a control signal to the injection controller to control injection of the storage stream in respective injection wells which are relatively depleted.

Element A10: further comprising a model library stored on a computer-readable storage device. Element A11: further comprising a system manager, implemented on at least one processor and coupled to the model library, wherein the system manager is configured to access one or more models in the model library and to obtain predictive data relating to the operation of the solar energy management system. Element A12: wherein the one or more models include one or more of a surface solar thermal collection model, a surface water desalination model, a thermal to electrical energy model, and one or more non-linear optimization models to simultaneously estimate reservoir void replacement and maintain heat storage to obtain continuous heat storage in the aquifer and a production output in the drive stream required to meet a heat demand of the utilization facility. Element A13: further comprising a set of thermal pipes coupling the heat exchanger to the injector wells and coupling the producer wells to the utilization facility. Element A14: wherein the set of thermal pipes comprise Reinforced Thermal Pipe (RTP) or Flexible Composite Pipe (FCP) pipe connections. Element A15: further comprising another set of thermal pipes coupling the heat exchanger to the first pre-heating unit and coupling the utilization facility to the first pre-heating unit.

Element 16: wherein the aquifer thermal storage system has a pressurized aquifer (such as a high pressure or geopressurized aquifer) with one or more injector wells and one or more production wells, and wherein the storage stream passes through the injector wells for storage in the pressurized aquifer and thermal energy in the storage stream is stored in the pressurized aquifer for later extraction through the production wells, wherein the pressurized aquifer is located subsurface below a hydrocarbon bearing reservoir, whereby fluids output from this pressurized aquifer may reduce an early onset of water breakthrough into the hydrocarbon bearing reservoir and extend the hydrocarbon production time and rate for the hydrocarbon bearing reservoir Embodiment B: A method for managing solar energy storage and production comprising: collecting incident radiation with a solar thermal collection unit and adding heat into a heat transfer fluid transfer fluid; conveying the heat transfer fluid through a first thermal pipe to a heat exchanger; pre-heating a spent stream from a utilization facility with a photovoltaic pre-heating system to generate a first pre-heated stream for output to the heat exchanger; transferring at the heat exchanger heat energy from the heat transfer fluid and the first pre-heated stream to a storage stream; outputting the storage stream with the added heat energy through a second thermal pipe to an aquifer thermal storage system; and monitoring heat storage and operational characteristics of the aquifer thermal storage system.

Embodiment B may have one or more of the following additional elements B1-B3 in any combination or all in combination: Element B1: further comprising: extracting a stream from the aquifer thermal storage system and outputting a drive stream having the stored thermal energy to a steam generator at the utilization facility; recovering a spent stream from the utilization facility; and pre-heating the spent stream with the photovoltaic pre-heating system to obtain another pre-heating stream for output to the heat exchanger. Element B2: further comprising: detecting temperature of the spent stream; circulating at least a part of the spent stream underneath or near the array of photovoltaic panels when the detected temperature of the spent stream is below ambient or below the temperature of the array of photovoltaic panels, and otherwise bypassing the circulating; and periodically washing surfaces of photovoltaic panels in the photovoltaic pre-heating system with a spray device. Element B3: wherein the monitoring includes detecting temperature in different areas near one or more injector wells and one or more production wells and processing output from chemical tracers near one or more injector wells and one or more production wells, and further comprising: controlling injection of the storage stream into one or more injection wells in the aquifer thermal storage system based on the detected temperature and processed output from the chemical tracers; enabling mode selection between a continuous mode and an intermittent mode of operation; and storing in a computer-readable storage device a model library in having one or more models.

Embodiment C: An aquifer management system configured to produce from a high pressure or geopressurized aquifer that exists below and connected to a hydrocarbon bearing reservoir. In this way, producing the fluids from this aquifer will reduce the early onset of water breakthrough into the hydrocarbon reservoir and thereby extend the hydrocarbon production time and rates from this reservoir.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof. In addition, the use of ordinal numbers (e.g., first, second, third, etc.) is for distinction and not counting. For example, the use of "third" does not imply there must be a corresponding "first" or "second." Also, as used herein, the terms "coupled" or "coupled to" or "connected" or "connected to" or "attached" or "attached to" may indicate establishing either a direct or indirect connection, and is not limited to either unless expressly referenced as such. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The term "based on" means "based at least in part on." The terms "about" and "approximately" can be used to include any numerical value that can vary without changing the basic function of that value. When used with a range, "about" and "approximately" also disclose the range defined by the absolute values of the two endpoints, e.g. "about 2 to about 4" also discloses the range "from 2 to 4." Generally, the terms "about" and "approximately" may refer to plus or minus 5-10% of the indicated number.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

What is claimed is:

1. A solar energy storage management system, comprising:

a solar thermal collection unit configured to collect incident radiation and add heat into a heat transfer fluid;

a first photovoltaic pre-heating system configured to preheat a spent stream from a utilization facility to generate a first pre-heated stream; and a heat exchanger configured to convey heat from the heat transfer fluid and the first pre-heated stream to a storage stream for output to an aquifer thermal storage system, wherein the first pre-heating system includes:

an array of photovoltaic panels configured to generate electrical power in response to incident radiation;

a spray device configured to spray at least a part of the spent stream from the utilization facility onto the array of photovoltaic panels to wash surfaces of the panels;

a pump configured to circulate at least a part of the spent stream from the utilization facility underneath or near the array of photovoltaic panels; and an electric heater configured to add heat to the spent stream to obtain the first pre-heated stream output to the heat exchanger, wherein each of the spray device, pump and electric heater are operated with the electrical power generated by the array of photovoltaic panels.

2. The solar energy storage management system of claim 1, wherein the first pre-heating system further includes a temperature sensor.

3. The solar energy storage management system of claim 1, further comprising a model library stored on a computer-readable storage device.

4. The solar energy storage management system of claim 3, further comprising a system manager, implemented on at least one processor and coupled to the model library, wherein the system manager is configured to access one or more models in the model library and to obtain predictive data relating to the operation of the solar energy management system.

5. The solar energy storage management system of claim 4, wherein the one or more models include one or more of a surface solar thermal collection model, a surface water desalination model, a thermal to electrical energy model, and one or more non-linear optimization models to simultaneously estimate reservoir void replacement and maintain heat storage to obtain continuous heat storage in the aquifer and a production output in the drive stream required to meet a heat demand of the utilization facility.

6. A solar energy storage management system, comprising:

a solar thermal collection unit configured to collect incident radiation and add heat into a heat transfer fluid;

a first photovoltaic pre-heating system configured to preheat a spent stream from a utilization facility to generate a first pre-heated stream; and a heat exchanger configured to convey heat from the heat transfer fluid and the first pre-heated stream to a storage stream for output to an aquifer thermal storage system, wherein the aquifer thermal storage system has an aquifer with one or more injector wells and one or more production wells, and wherein the storage stream passes through the injector wells for storage in the aquifer and thermal energy in the storage stream is stored in the aquifer for later extraction through the production wells, whereby a drive stream having the stored thermal energy can be used to drive a steam generator at the utilization facility; and wherein the aquifer includes at least one of a depleted aquifer or a geopressurized aquifer, and wherein the geopressurized aquifer is located subsurface below a hydrocarbon zone in sedimentary rock.

7. The solar energy storage management system of claim 6, further comprising a second photovoltaic pre-heating system configured to add heat to a stream extracted from the production wells to generate the drive stream.

8. The solar energy storage management system of claim 6, wherein the injector wells further include an oriented perforation towards the production wells to further improve heat transfer.

9. The solar energy storage management system of claim 6, wherein the injector wells and the production wells are arranged in a pattern having a central production well surrounded by a set of injector wells, whereby, heat energy is further constrained within the aquifer in the vicinity of the central production well and surrounding injector wells.

10. The solar energy storage management system of claim 6, wherein the injector wells and the production wells are arranged in pattern having multiple injector wells per production well.

11. The solar energy storage management system of claim 6, further comprising a system manager, implemented on at least one processor, wherein the system manager includes:

an injection controller configured to control injection of the storage stream output from the heat exchanger into the injection wells; and a mode selector configured to operate in either a continuous mode or an intermittent mode such that the injection of the storage stream into the injection wells and output through the producer wells occurs continuously during operation to provide a baseload to the utilization facility in the continuous mode or occurs during periods when operation is needed to meet demand to provide a baseload to the utilization facility in the intermittent mode.

12. The solar energy storage management system of claim 11, further comprising:

a fiber optic distributed temperature system configured to detect temperature in different areas near the injector wells and producer wells within the aquifer; and a tracer monitor configured to monitor a set of chemical tracers near the injector wells and producer wells within the aquifer, wherein the system manager is configured to process input from the fiber optic distributed temperature system and send a control signal to the injection controller to control injection of the storage stream in respective injection wells to balance temperature differences across the aquifer, and wherein the system manager is further configured to process input from the tracer monitor and send a control signal to the injection controller to control injection of the storage stream in respective injection wells which are relatively depleted.

13. The solar energy storage management system of claim 6, further comprising a set of thermal pipes coupling the heat exchanger to the injector wells and coupling the producer wells to the utilization facility.

14. The solar energy storage management system of claim 13, wherein the set of thermal pipes comprise Reinforced Thermal Pipe (RTP) or Flexible Composite Pipe (FCP) pipe connections.

15. The solar energy storage management system of claim 13, further comprising another set of thermal pipes coupling the heat exchanger to the first pre-heating unit and coupling the utilization facility to the first pre-heating unit.

16. A solar energy storage management system, comprising:

a solar thermal collection unit configured to collect incident radiation and add heat into a heat transfer fluid;

a first photovoltaic pre-heating system configured to preheat a spent stream from a utilization facility to generate a first pre-heated stream; and a heat exchanger configured to convey heat from the heat transfer fluid and the first pre-heated stream to a storage stream for output to an aquifer thermal storage system, wherein the aquifer thermal storage system has a pressurized aquifer with one or more injector wells and one or more production wells, and wherein the storage stream passes through the injector wells for storage in the pressurized aquifer and thermal energy in the storage stream is stored in the pressurized aquifer for later extraction through the production wells, wherein the pressurized aquifer is located subsurface below a hydrocarbon bearing reservoir, whereby fluids output from this pressurized aquifer may reduce an early onset of water breakthrough into the hydrocarbon bearing reservoir and extend the hydrocarbon production time and rate for the hydrocarbon bearing reservoir.

* * * * *